United States Patent
Motschi

(10) Patent No.: US 11,179,783 B2
(45) Date of Patent: Nov. 23, 2021

(54) QUICK CHANGEABLE COLLET CLAMPING ASSEMBLY

(71) Applicant: Schaublin SA, Delemont (CH)

(72) Inventor: René Motschi, Oberbuchsiten (CH)

(73) Assignee: Schaublin SA, Delemont (CH)

( * ) Notice: Subject to any disclaimer, the term of this patent is extended or adjusted under 35 U.S.C. 154(b) by 0 days.

(21) Appl. No.: 16/361,774

(22) Filed: Mar. 22, 2019

(65) Prior Publication Data

US 2019/0299299 A1 Oct. 3, 2019

Related U.S. Application Data

(60) Provisional application No. 62/649,742, filed on Mar. 29, 2018.

(51) Int. Cl.
*B23B 31/20* (2006.01)
*B23B 31/40* (2006.01)
*B23B 31/117* (2006.01)

(52) U.S. Cl.
CPC ........ *B23B 31/207* (2013.01); *B23B 31/1177* (2013.01); *B23B 31/4033* (2013.01); *B23B 2231/20* (2013.01); *B23B 2231/2091* (2013.01)

(58) Field of Classification Search
CPC .............. B23B 31/207; B23B 31/4033; B23B 31/1177; B23B 2231/2091; B23B 2231/20; B23B 31/4066; B23B 31/265; B23B 2231/2078
See application file for complete search history.

(56) References Cited

U.S. PATENT DOCUMENTS

| | | | |
|---|---|---|---|
| 2,824,744 | A | 2/1958 | Peters |
| 3,104,885 | A | 9/1963 | Dunham |
| 4,580,796 | A | 4/1986 | Baur et al. |
| 4,928,373 | A | 5/1990 | Massa et al. |
| 5,326,114 | A | 7/1994 | Piotrowski |
| 5,383,673 | A * | 1/1995 | Mogilnicki ........... B23B 31/202 279/46.4 |
| 6,257,595 | B1 | 7/2001 | Difasi et al. |
| 7,971,883 | B2 | 7/2011 | Soroka et al. |

(Continued)

FOREIGN PATENT DOCUMENTS

| | | |
|---|---|---|
| CN | 201086132 Y | 7/2008 |
| CN | 101722339 A | 6/2010 |

(Continued)

OTHER PUBLICATIONS

Extended European Search Report issued in corresponding EP Application No. 19164704.9, dated Aug. 16, 2019, pp. 1-8.

*Primary Examiner* — Eric A. Gates
*Assistant Examiner* — Paul M Janeski
(74) *Attorney, Agent, or Firm* — Murtha Cullina LLP

(57) ABSTRACT

A clamping assembly includes a collet adapter and an expansion sleeve movably disposed in collet adapter and a draw pin movably disposed in the expansion sleeve. The expansion sleeve cooperates with the draw pin to define a containment system configured maintain the expansion sleeve within an axial envelope and a radial envelope within the collet adapter. Axial movement of the draw pin in the expansion sleeve within the axial envelope causes a portion of the expansion sleeve to expand radially outward to a predetermined maximum diameter to releasably clamp the collet in the collet adapter.

18 Claims, 14 Drawing Sheets

(56) References Cited

U.S. PATENT DOCUMENTS

| | | | |
|---|---|---|---|
| 2003/0052462 A1* | 3/2003 | Komine | B23B 31/202 279/46.9 |
| 2006/0097463 A1 | 5/2006 | Laube et al. | |
| 2009/0304474 A1 | 12/2009 | Furuhata et al. | |
| 2011/0158759 A1* | 6/2011 | Jansen | B23B 31/1122 409/234 |
| 2017/0355024 A1 | 12/2017 | Motschi | |
| 2018/0021745 A1 | 1/2018 | Hamaker et al. | |

FOREIGN PATENT DOCUMENTS

| | | | |
|---|---|---|---|
| CN | 201940633 U | 8/2011 | |
| CN | 104384528 A | 3/2015 | |
| CN | 104416180 B | 1/2018 | |
| CN | 107755726 A | 3/2018 | |
| DE | 1263455 B | 3/1968 | |
| EP | 0179024 A1 * | 4/1986 | B23B 31/263 |
| EP | 0630716 A1 | 12/1994 | |
| EP | 1961507 A2 * | 8/2008 | B23B 31/006 |
| EP | 2130633 A2 * | 12/2009 | B23B 31/265 |
| EP | 3406377 A1 | 11/2018 | |
| FR | 2410206 A1 | 6/1979 | |
| FR | 2806016 B1 | 6/2002 | |
| JP | 2004249445 A | 9/2004 | |
| JP | 2004276179 A | 10/2004 | |
| JP | 4311957 B2 | 8/2009 | |
| JP | 5712838 B2 | 5/2015 | |
| JP | 5712840 B2 | 5/2015 | |
| JP | 6185158 B2 | 8/2017 | |
| KR | 19950000813 B1 | 2/1995 | |
| KR | 1020050066714 A | 6/2005 | |
| KR | 1020130022903 A | 3/2013 | |
| SU | 1219268 A1 | 3/1986 | |
| WO | WO-2009010037 A1 * | 1/2009 | B23B 31/265 |
| WO | 2011059945 A1 | 5/2011 | |
| WO | 2017215881 A1 | 12/2017 | |

* cited by examiner

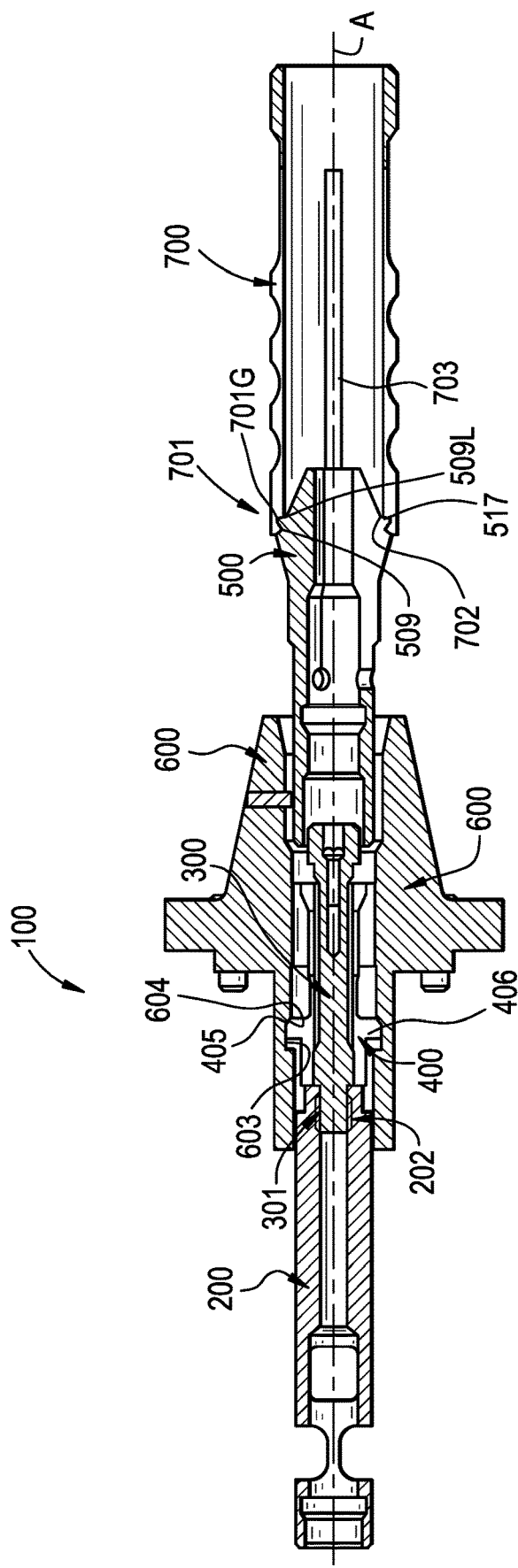

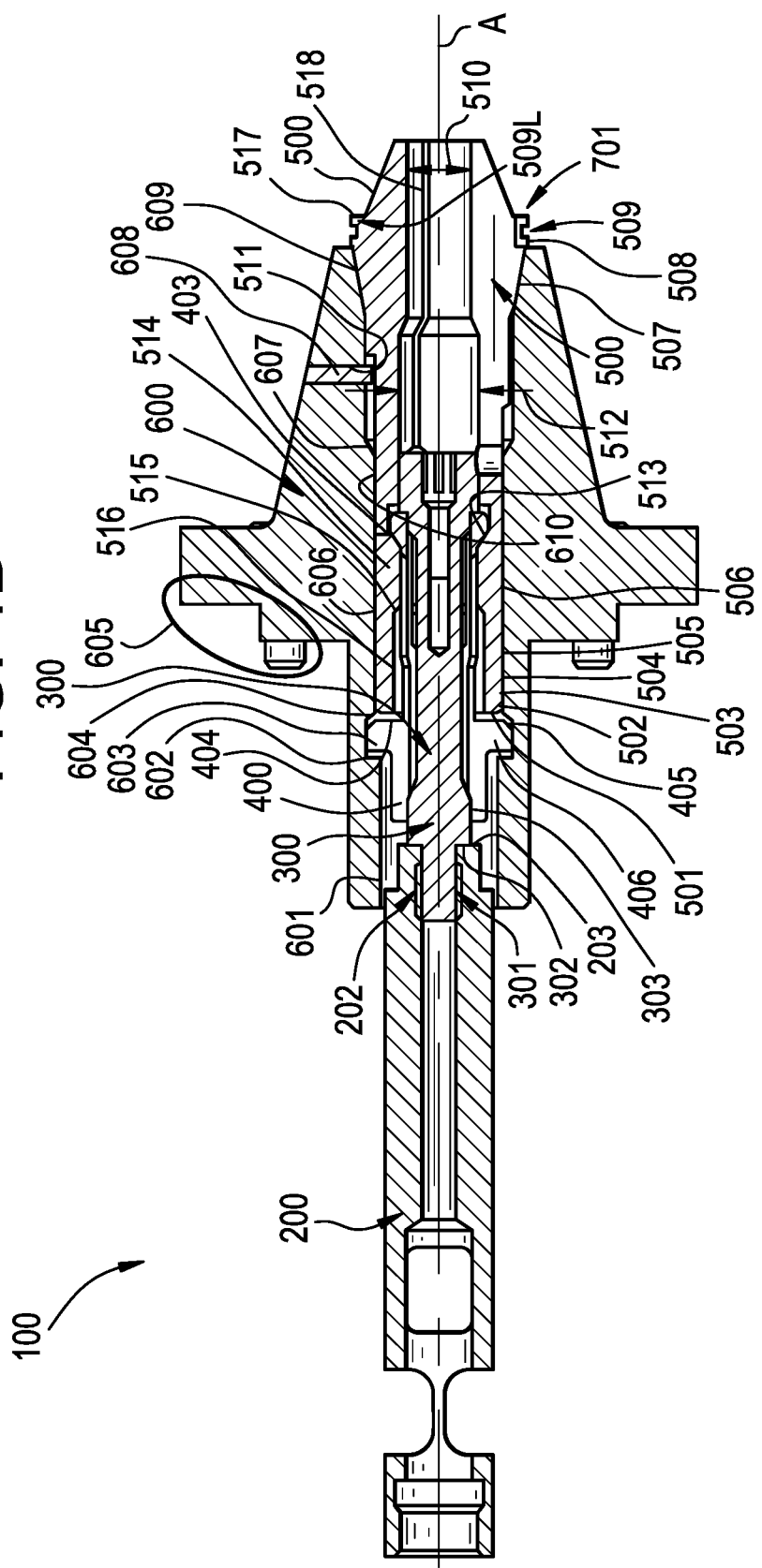

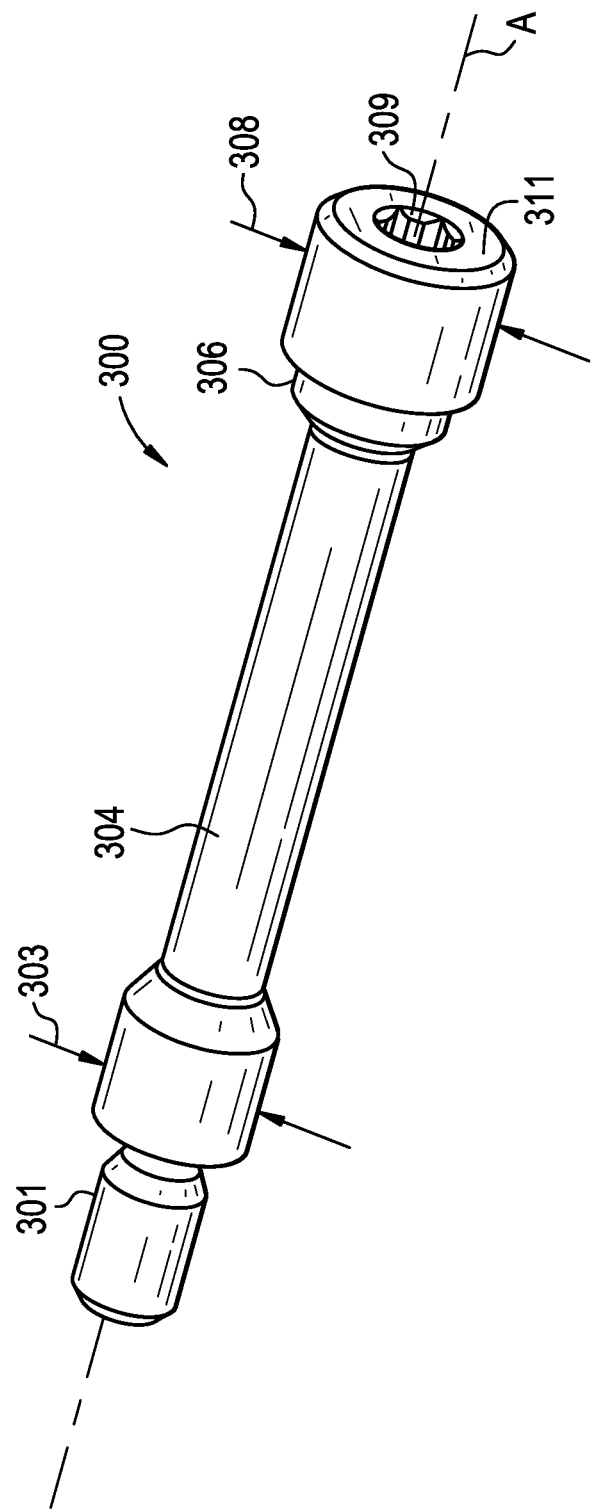

QUICK CHANGEABLE COLLET CLAMPING ASSEMBLY

CROSS REFERENCE TO RELATED APPLICATIONS

This application claims priority to commonly owned U.S. Provisional Application Ser. No. 62/649,742, entitled "Quick Change Collet Clamping System", filed Mar. 29, 2018, the entirety of which is incorporated herein by reference.

TECHNICAL FIELD

The present invention relates to a manual and/or automatic quick-change clamping assembly for releasably securing a collet to a turning machine or any other type of machine tool, and is more particularly related to a clamping assembly having a collet adapter with an expansion sleeve removably disposed therein and having a clamping portion thereon and with a draw pin extending through a bore in the expansion sleeve so that a portion of the draw pin engages the expansion sleeve causing radially outward movement of the clamping portion in response to axial displacement of the draw pin relative to the expansion sleeve, to releasably secure a collet in the collet adapter.

The present invention is further directed to an extraction tool for removing the collet from the clamping assembly.

BACKGROUND OF THE INVENTION

A collet is a device having two or more "jaws" between which an object such as a tool or a workpiece can be positioned. The jaws form a collar around the object. The jaws of the collet are configured to constrict around the object by deflecting radially inward. The jaws may be deflected radially inward by pushing a suitable mechanism (e.g., a collet adapter) around the circumference of the collet. In another type of collet called a draw-in collet, the collet is tapered and drawn into a sleeve (e.g., a collet adapter) by a draw bar to cause the jaws to constrict around the tool or workpiece. Collets are typically fabricated from steel, which allows the jaws to be sufficiently flexible relative to each other to allow the jaws to flex and hold the tool or workpiece.

The collet is held in a clamping device (e.g., a collet adapter and draw bar), which is connected to a shaft that can be rotated, which in turn causes the tool or the workpiece to rotate. In instances in which a tool is clamped in the collet and rotated, the tool is made to engage or be engaged by a workpiece. In instances in which the workpiece is clamped in the collet and rotated, the workpiece engages or is engaged by a tool.

Set-up and changing the collet usually are made manually and the set-up time often is considered being too long. Also, the set-up of the collet always requires a manual intervention of the operator and this stops production in the unmanned shift. Typically, the collet is screwed on a drawbar and angularly oriented with a pin. Often, this pin has to be taken away for screwing the collet on the drawbar, and then put back at its place in the collet adapter. This procedure isn't user-friendly and the collet may get damaged when putting the pin back in the keyway.

Thus, there is a need for an improved connection allowing a quicker and easier manual set-up time and/or an automatic set-up of the collet.

The rotational accuracy of the tool or the workpiece affects the process of removing swarf (e.g., metal chips) from the workpiece. In particular, the rotational accuracy of the tool or the workpiece is typically a function of concentricity along the axis of rotation. The concentricity achieved with mechanical clamping is often inadequate or compromised during rotation, thereby resulting in run-out. Such run-out can detrimentally affect the finished workpiece. Multiple cycles of operation of the pulling device can cause the concentricity to change for each cycle, thereby causing an inconsistent and unacceptable run-out accuracy.

The collet is removably attached to the draw bar by a suitable fastener. However, there is typically a gap on the guiding diameter between the collet and the collet adapter. This gap causes variation of concentricity between the collet and the rotation axis due to different reasons, such as variation of friction in the clamping system of the machine tool, variation of clamping force, such as pressure, direction, pulsation, vibrations, machining forces or other external influences on the tool or the workpiece, different angular orientation of the spindle between different clamping cycles, influence of dust, chips, wear and temperature.

Thus, there is a need for an improved connection between the collet and draw bar and an enhanced holding and guiding of the collet in the collet adapter. Also there is a need for an automatic procedure to load and extract the collet.

SUMMARY OF THE INVENTION

According to aspects illustrated herein, there is disclosed a clamping assembly for releasably clamping a collet. The clamping assembly includes a collet adapter and an expansion sleeve movably disposed in collet adapter. The clamping assembly includes a draw pin movably disposed in the expansion sleeve. The expansion sleeve cooperates with the draw pin to define a containment system configured maintain the expansion sleeve within an axial envelope and a radial envelope within the collet adapter. Axial movement of the draw pin in the expansion sleeve within the axial envelope causes a portion of the expansion sleeve to expand radially outward to a predetermined maximum diameter to releasably clamp the collet in the collet adapter.

According to aspects illustrated herein, there is provided a clamping assembly (100) for releasably clamping a collet (500), the clamping assembly (100) including a collet adapter (600) having a first interior surface (601, 602, 603, 604, 606, 607, 609, 610) defining a first bore (600B) concentric about a longitudinal axis (A), the first bore (600B) extending from a collet loading end (600C) to a draw bar receiving end (600A) of the collet adapter (600); an expansion sleeve (400) removably disposed in the first bore (600B) and in sliding engagement with a portion of the first interior surface (601, 602, 603, 604, 606, 607, 609, 610), the expansion sleeve (400) having a second interior surface (402, 409) defining a second bore (400B) extending between a first end (401) and a second end (408) thereof, the expansion sleeve (400) having a first exterior surface (403, 404, 405, 406, 407, 410) extending therearound and the expansion sleeve (400) having a portion of the first exterior surface defining a tapered clamping portion (403) proximate the first end (401) thereof; and a draw pin (300) removably disposed at least partially in the second bore (400B), the draw pin (300) having a second exterior surface (301, 302, 303, 305, 306 307, 308, 311), wherein a portion (305) of the second exterior surface engages a portion of the second interior surface (402) of the expansion sleeve (400) causing radially outward movement of the clamping portion (403) in response to axial displacement of the draw pin (300) relative to the expansion sleeve (400).

In one embodiment, the expansion sleeve (400) includes two or more slots each of which extend along an axial length of the expansion sleeve and extend axially inward from the first end (401) and/or the second end (408).

In one embodiment, the clamping portion (403) includes a first axial leg (413A, 413B) and a second axial leg (413C, 413D). The first axial leg and the second axial leg are separated circumferentially by a first axial slot (412) and a second axial slot (412). Each of the first axial slot and the second axial slot extend axially inward from the first end (401). The first axial slot and the second axial slot impart flexibility to the clamping portion (403) so that the first axial leg and the second axial leg flex radially in response to the axial displacement of the draw pin (300) relative to the expansion sleeve (400).

In one embodiment, the clamping portion (403) includes a tapered surface.

In one embodiment, the expansion sleeve (400) includes a third axial leg (414A, 414B) and a fourth axial leg (414C, 414D). The third axial leg and the fourth axial leg are separated circumferentially by a third axial slot (411) and a fourth axial slot (411). Each of the third axial slot and the fourth axial slot extend axially inward from the second end (408). The third axial slot and the fourth axial slot impart flexibility to the expansion sleeve (400) so that the third axial leg and the fourth axial leg flex radially in response to the axial displacement of the draw pin (300) relative to the expansion sleeve (400).

In one embodiment, the collet adapter includes a first containment feature and the expansion sleeve includes a second containment feature. The first containment feature engages the second containment feature to releasably contain the expansion sleeve in the first bore and to limit axial movement of the expansion sleeve in the first bore to a predetermined distance (603L).

In one embodiment, the first containment feature includes a circumferential groove (603) extending radially outward from the interior surface (601) to a depth (603D) and the second containment feature comprises a circumferential tab (406) that extends radially outward from the expansion sleeve a height (406H) to limit radial expansion of a portion of the expansion sleeve to a predetermine magnitude established to prevent plastic deformation of the expansion sleeve.

In one embodiment, the circumferential groove (603) includes a first taper (604) on a side thereof to facilitate installation and removal of the expansion sleeve in the collet adapter.

In one embodiment, the circumferential tab (406) includes a second taper (405) to facilitate installation and removal of the expansion sleeve in the collet adapter.

In one embodiment, the draw pin (300) includes a taper (305) on the second exterior surface. The taper is configured to urge the clamping portion (403) radially outward to secure the collet in the collet adapter.

In one embodiment, the draw pin (300) includes a circumferential shoulder (306) on the second exterior surface to retain the clamping portion (403) radially outward to secure the collet in the collet adapter.

In one embodiment, one of the first axial slot (412) and the second axial slot (412) extend into one of the third axial leg (414A, 414B) and the fourth axial leg (414C, 414D). In one embodiment, one of the third axial slot (411) and the fourth axial slot (411) extend into one of the first axial leg (413A, 413B) and the second axial leg (413C, 413D).

According to aspects illustrated herein, there is provided a collet extraction tool (700) for extracting a collet from a collet adapter, the extraction tool including one or more latches (701) for releasably grasping the collet.

In one embodiment, the collet extraction tool is a castellated tube having two or more legs (703L) that extend from a ring (703R) portion of the tube. Adjacent pairs of the legs are spaced apart by a respective slot (703). The latch includes a circumferential groove (701G) that extends around an inner surface of the tube. The circumferential groove is configured to receive a lip (509L) extending around an exterior surface of the collet.

In one embodiment, the groove (701) has one or more axial lands (702) configured to engage a portion of the collet. Any of the foregoing embodiments may be combined.

BRIEF DESCRIPTION OF THE DRAWINGS

Referring now to the Figures, which are exemplary embodiments, and wherein the like elements are numbered alike:

FIG. 3 is a cross sectional view of the clamping assembly of FIG. 1 shown in the extracting position with a collet, a collet adapter, a draw bar, a draw pin, an expansion sleeve and the collet extraction tool;

FIG. 4B is a cross sectional view of the clamping assembly of FIG. 1 shown in the clamping position with the collet, the collet adapter, the draw bar, the draw pin and the expansion sleeve;

FIG. 7A is a perspective view of the draw pin;

DETAILED DESCRIPTION

Figure 1:
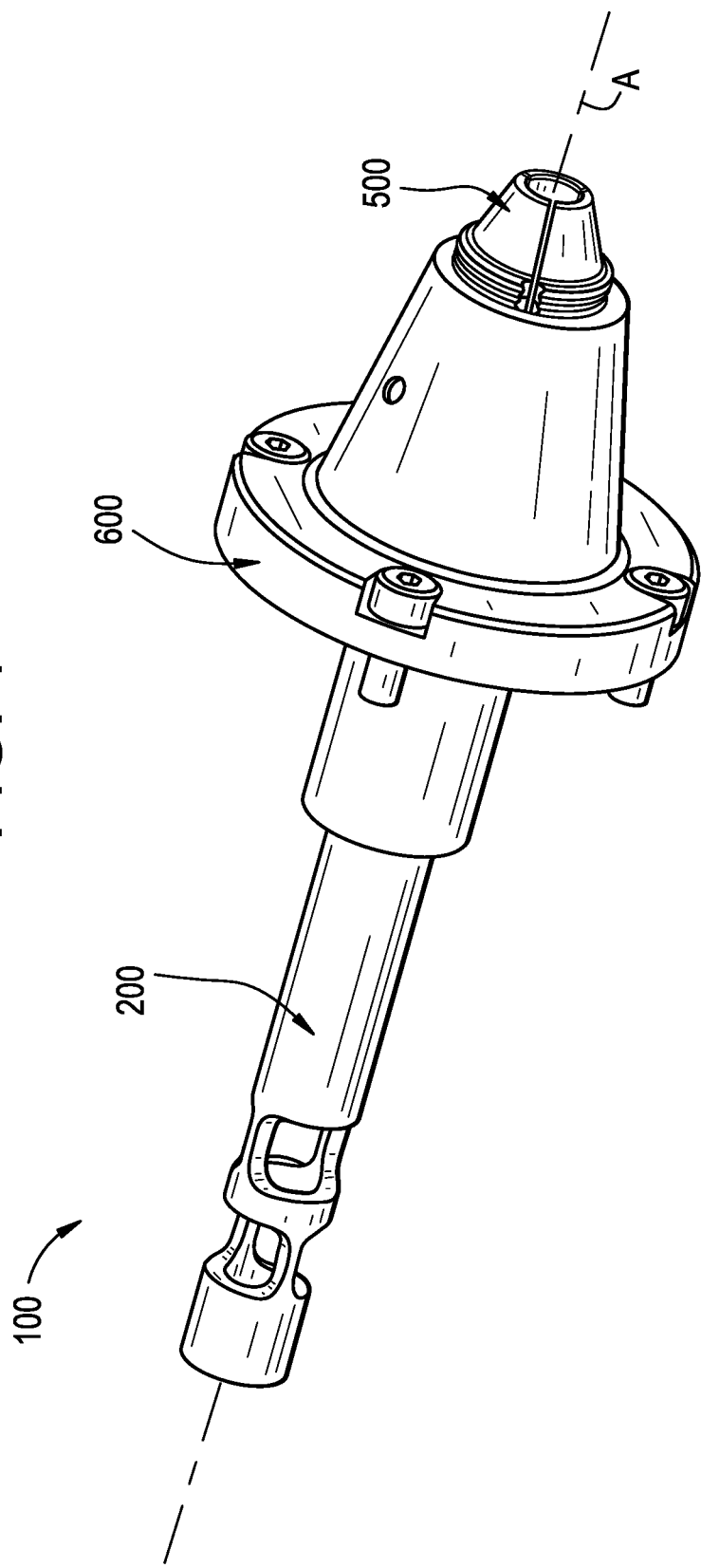
FIG. 1 is a perspective view of the clamping assembly of the present invention shown in the clamped position with the collet, the collet adapter and the draw bar.
Figure 2:
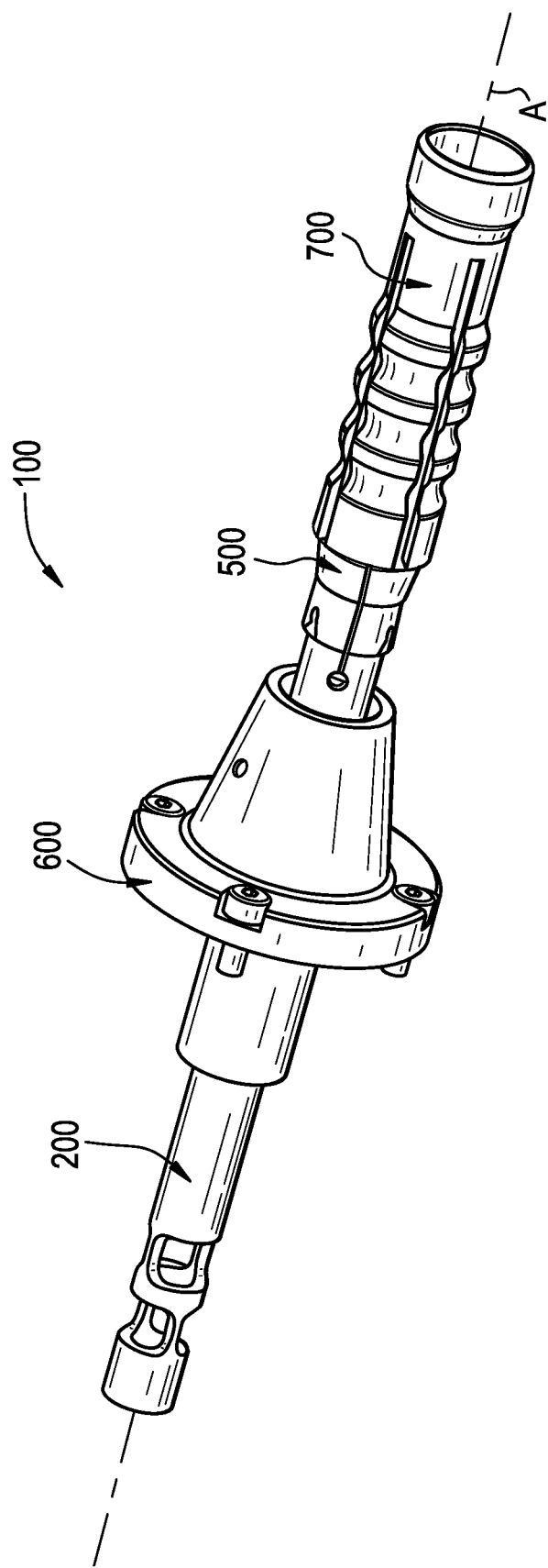
FIG. 2 is a perspective view of the clamping assembly of FIG. 1 an extracting position with a collet clamped therein, a draw bar connected thereto and a collet extraction tool arranged to extract the collet from the collet adapter.

As shown in FIGS. 1-3, some embodiments of the present disclosure are directed to a clamping assembly 100 including a draw bar 200, an expansion sleeve 400, a collet 500, and a collet adapter 600. FIG. 1 shows collet assembly 100 in a clamped position in which a clamping force is exerted on the collet 500 to hold the collet within the collet adapter 600. FIGS. 2 and 3 show the collet assembly 100 in an extracting position, where a collet extractor 700 is used to remove the collet 500 from the collet adapter 600, as is discussed in greater detail herein. The clamping assembly 100 does not employ any coil springs.

Figure 4A:
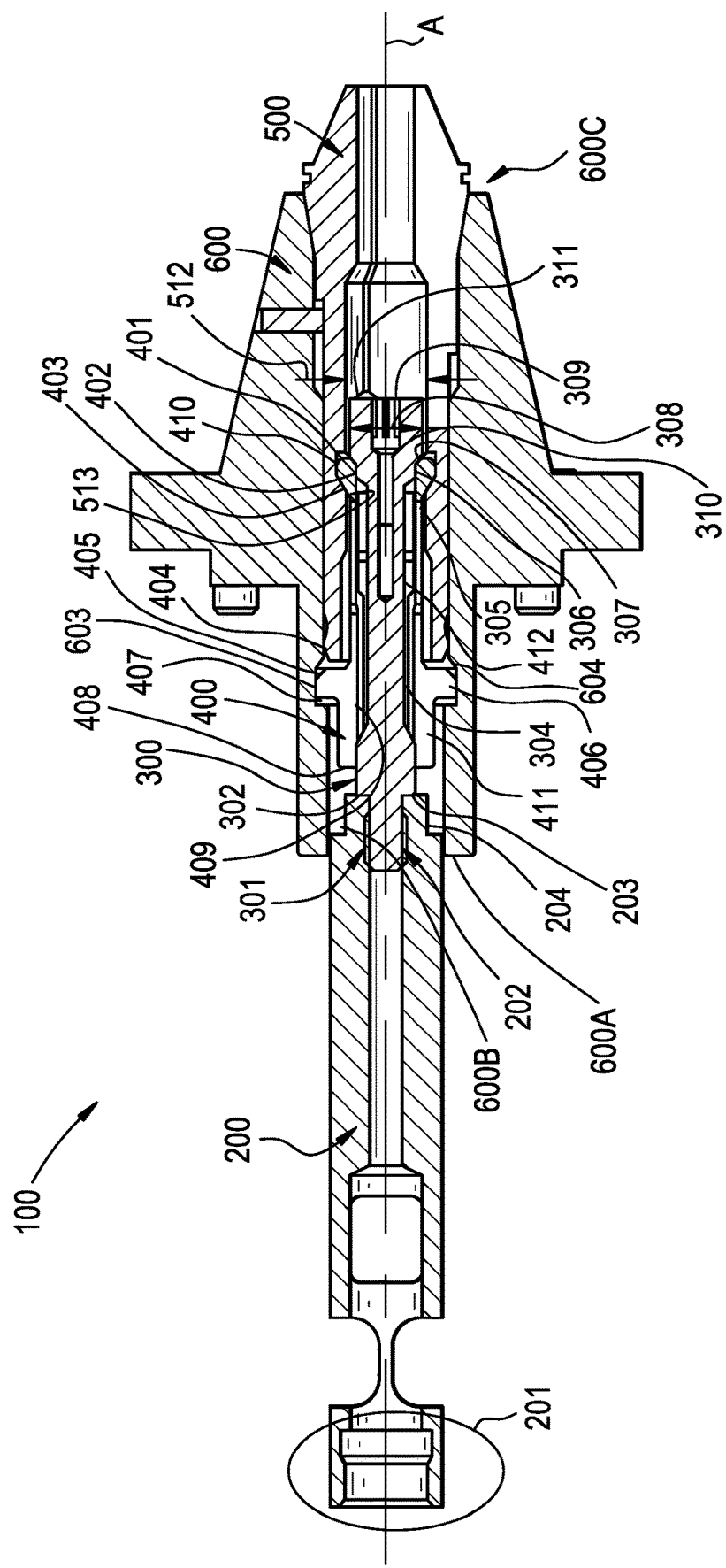
FIG. 4A is a cross sectional view of the clamping assembly of FIG. 1 shown in the clamping position with the collet, the collet adapter, the draw bar, the draw pin and the expansion sleeve.
Figure 5:
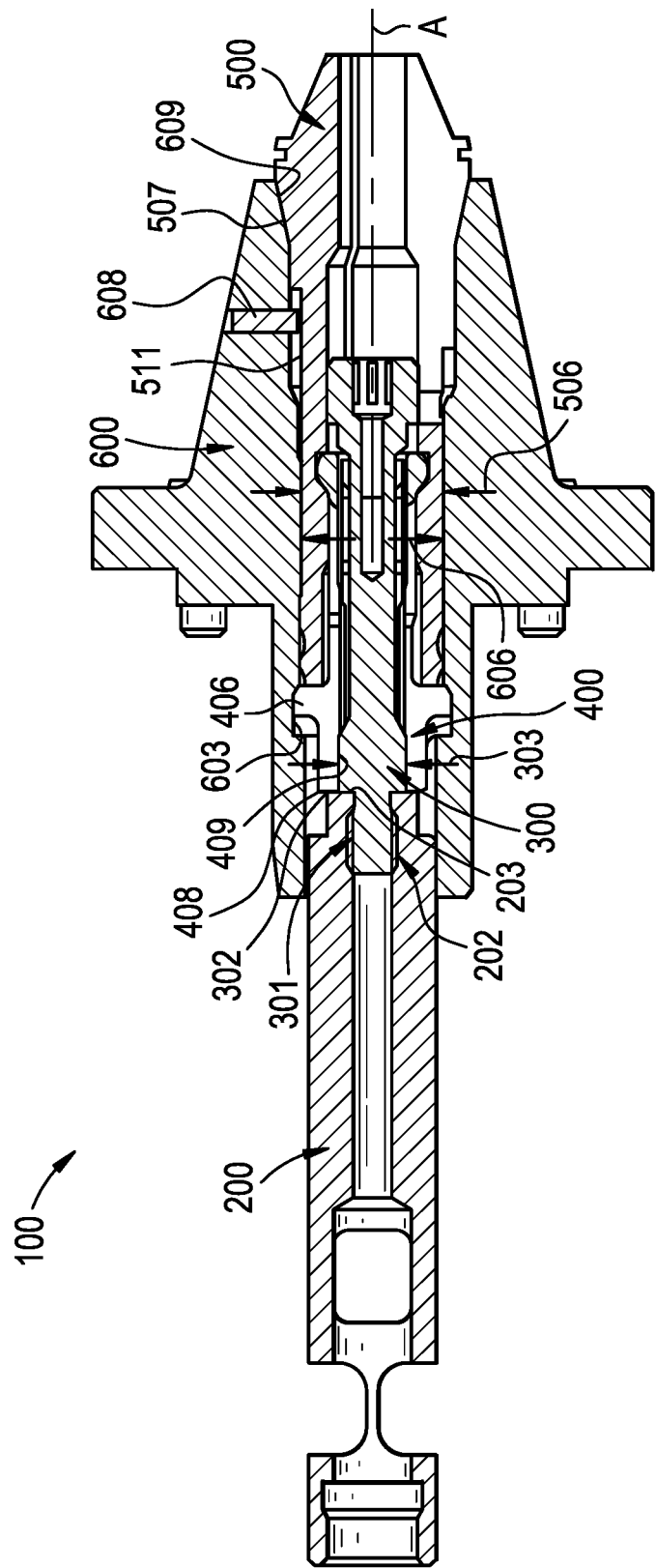
FIG. 5 is a cross sectional view of the clamping assembly of FIG. 1 shown in the unclamped position with the collet, the collet adapter, the draw bar, the draw pin and the expansion sleeve.
Figure 6:
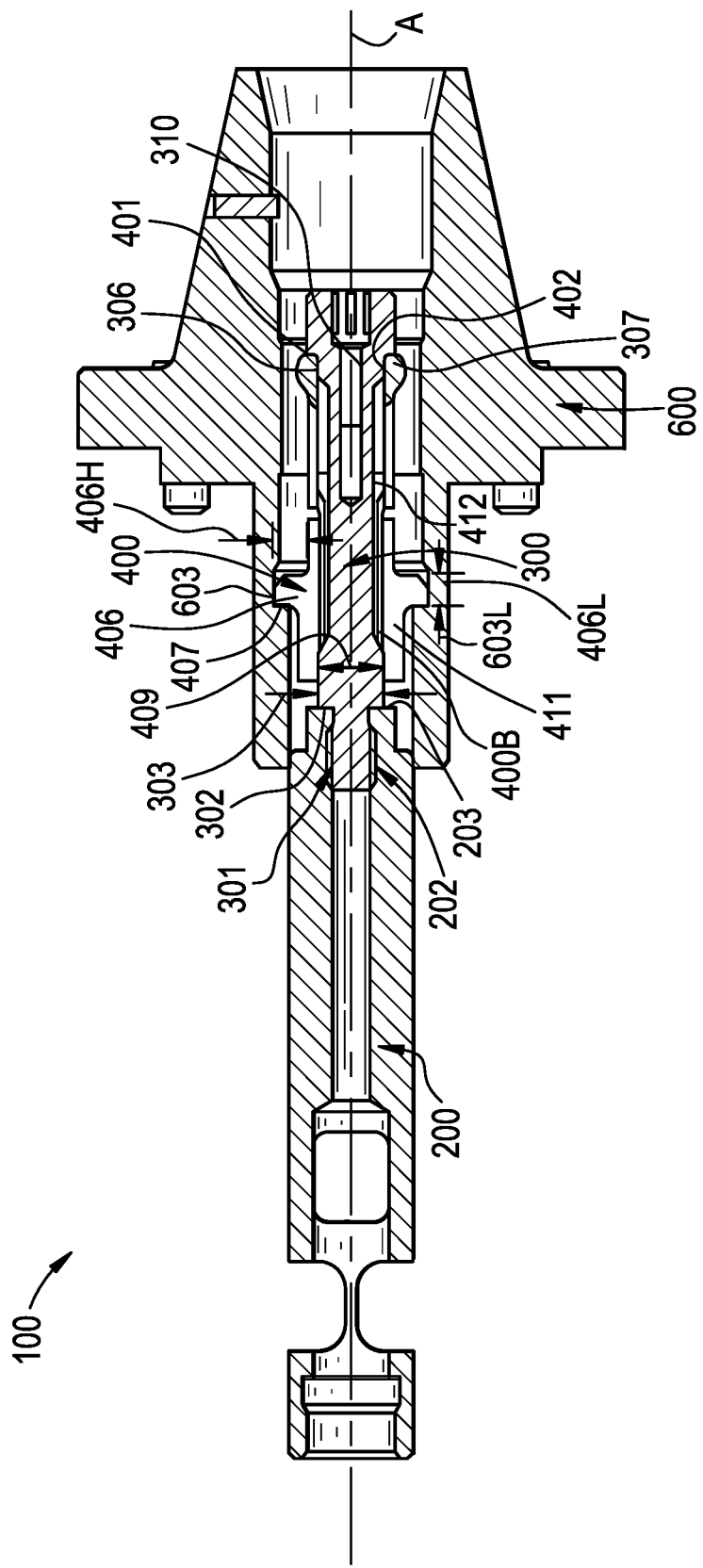
FIG. 6 is a cross sectional view of the clamping assembly of FIG. 1 shown in an empty clamped position with the collet adapter, the draw bar, the draw pin and the expansion sleeve, but with the collet removed.
Figure 7B:
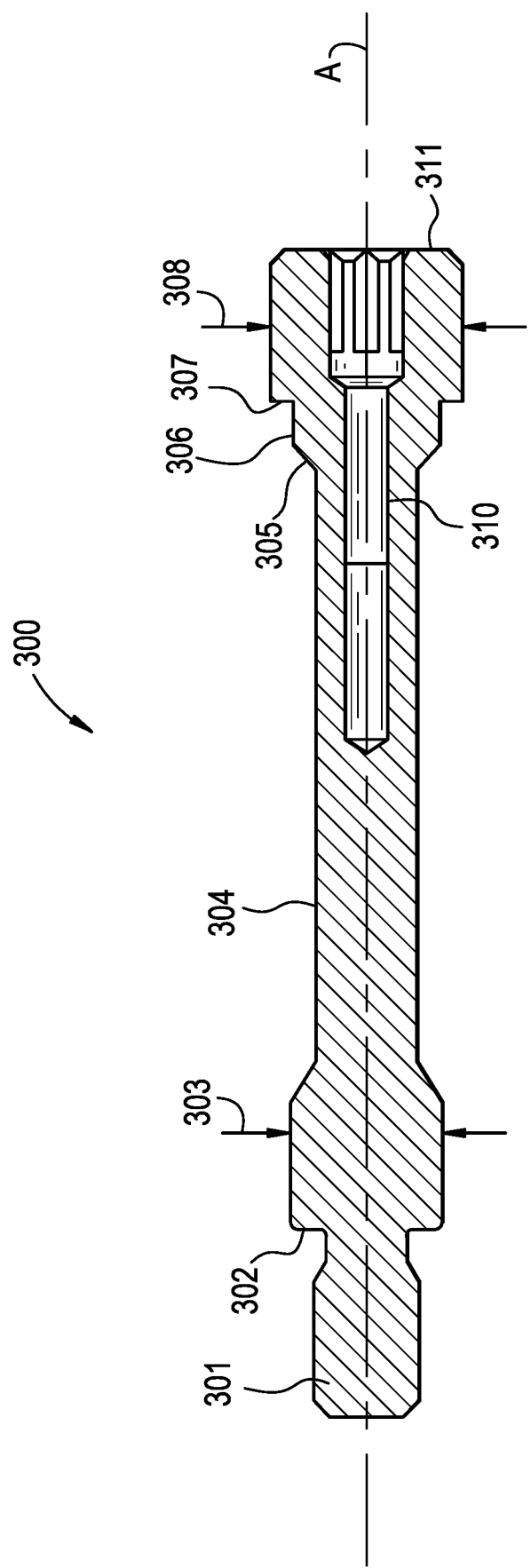
FIG. 7B is a cross sectional view of the draw pin.
Figure 8:
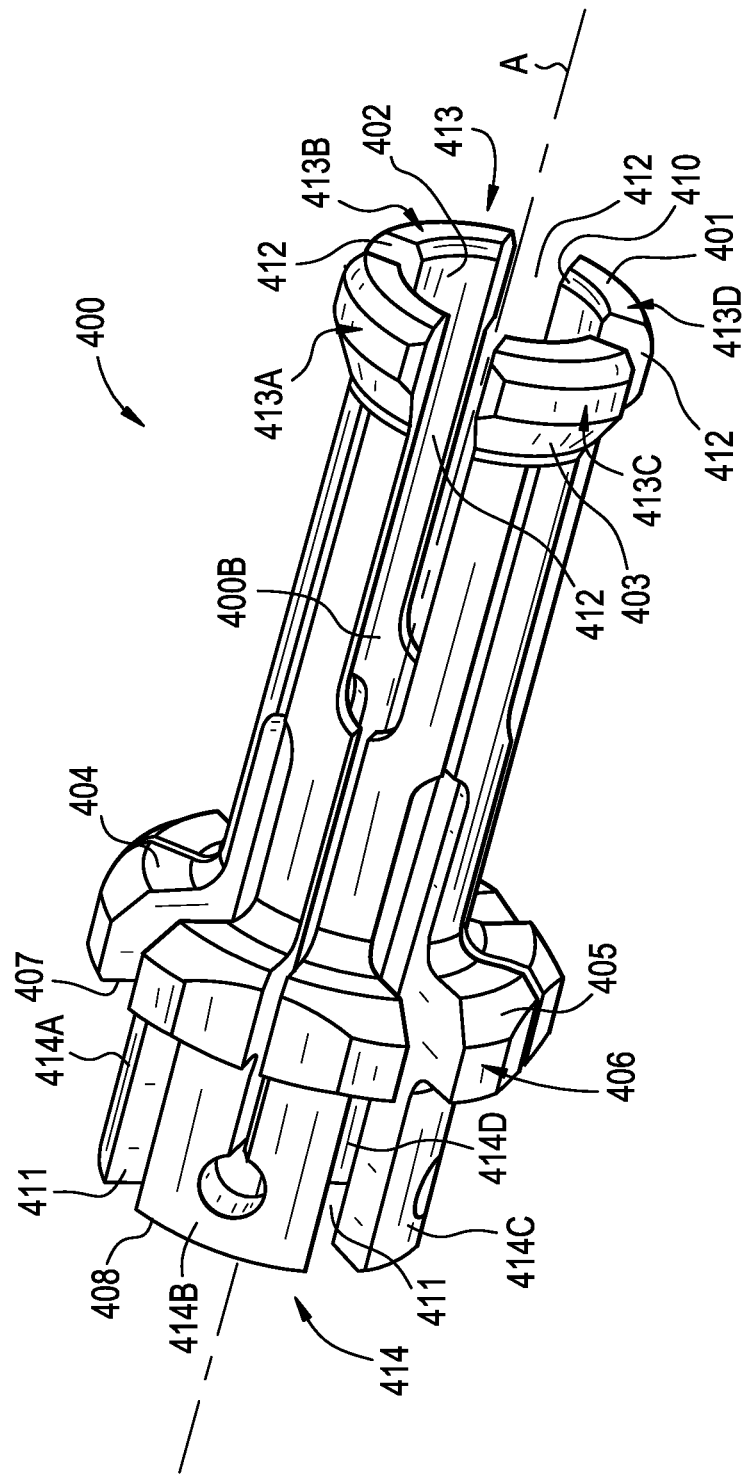
FIG. 8 is a perspective view of the expansion sleeve.

Referring to FIGS. 4A and 4B, the draw bar 200 includes a draw bar mounting portion 201 for connection to a translation device (not shown). The translation device is configured and positioned to provide an axial movement force, rotational movement force, or combinations thereof to the draw bar 200. The axial movement forces can be pushing forces or pulling forces. Axial pulling forces result in clamping of the collet 500 in place within clamping assembly 100. Similarly, axial pushing forces result in unclamping of the collet 500, enabling easier removal than when in the clamped position.

The draw bar 200 includes a draw bar coupling portion 202 for connection with a draw pin 300. A draw bar end face 203 is disposed axially opposite the draw bar mounting portion 201. The draw bar end face 203 is positioned to provide axial movement during unclamping. In one embodiment, the draw bar 200 includes a draw bar hex 204 positioned to enable easier application of rotation forces upon the draw bar 200, e.g., to tighten the draw bar 200 into or remove the draw bar 200 from the translation device.

Referring to FIGS. 4A-4B and 7A-7B, the draw pin 300 includes an exterior surface (301, 302, 303, 304, 305, 306, 307, 308, and 311). Specifically, the draw pin 300 includes a draw pin coupling portion 301. The draw pin coupling portion 301 is configured to interface with the draw bar mounting portion 202 and fixedly hold the draw bar 200 and draw pin 300 together. In one embodiment, the draw pin coupling portion 301 and the draw bar mounting portion 202 have complementary threaded areas. The draw pin includes a first draw pin face 302, which interfaces with the draw bar end face 203. Thus, axial pushing movement of the draw bar 200 is transmitted via the draw bar face 203 to the first draw pin face 302, resulting in axial pushing movement of the draw pin 300. Along the length of the draw pin 300, there is a first guiding diameter 303, a draw pin groove 304, a draw pin taper 305, a circumferential shoulder 306, and a third guiding diameter 308. A second draw pin face 307 is positioned between the circumferential shoulder 306 and the third guiding diameter 308. The third guiding diameter 308 helps maintain concentricity between the draw pin 300 and the collet 500. In one embodiment, the draw pin 300 includes a draw pin hexagonal shaped bore 309 extending into the draw pin 300 and positioned to receive a hexagonal shaped male driver to enable application of rotation forces upon the draw pin 300, e.g., to tighten the draw pin 300 into or remove the draw pin 300 from the draw bar 200. In one embodiment, the draw pin 300 includes a draw pin thread 310 that allows fixation of an end stop for a workpiece. A draw pin end face 311 is disposed axially opposite the draw pin coupling portion 301. The draw pin end face 311 is positioned to eject a workpiece, as is discussed in greater detail herein.

Referring now to FIGS. 4A-6, the collet adapter 600 includes a hollow body having a draw bar receiving end 600A, a collet loading end 600C, and a first bore 600B disposed therebetween, each concentric about the longitudinal axis A. The collet adapter 600 joins the collet 500 to a machine spindle, as well as keeps an expansion sleeve 400 in a predetermined position.

The collet adapter 600 includes a first inner surface defined by first adapter guiding diameter 601, groove stop face 602, circumferential groove 603, first taper 604, adapter guiding diameter 606, adapter lead-in taper 607, clamping taper 609, and adapter lead-in diameter 610. The first adapter guiding diameter 601, adapter guiding diameter 606, clamping taper 609, and adapter lead-in diameter 610 are positioned and configured to center other components of clamping assembly 100, e.g., the expansion sleeve 400, the collet 500, etc. The adapter lead-in taper 607 prevents frontal collision between the collet 500 and the collet adapter 600 while loading the collet 500. As is discussed in greater detail herein, the adapter guiding diameter 606 is sized and configured to receive collet 500 as is deflected by a clamping force. The adapter guiding diameter 606 also helps maintain concentricity of the collet 500 and the draw bar 200.

The circumferential groove 603 has a depth 603D and a length 603L, and is sized and configured to receive the expansion sleeve 400 as is discussed in greater detail herein. The collet adapter 600 includes a mounting portion 605 for joining the clamping assembly 100 to the machine spindle. In one embodiment, the collet adapter 600 includes an orientation pin (608), sized and configured to consistently orient the collet 500 and prevent rotational movement thereof, as is discussed in greater detail herein.

As shown in FIGS. 4A-6 and 8, a portion of the draw pin 300 is positioned within an expansion sleeve 400. The expansion sleeve includes a first end 401 which is located axially opposite a second end 408 with a second bore 400B therebetween. In one embodiment, the first end includes a lead-in taper 410, which enables easier loading of the collet 500 by limiting frontal collision (e.g., contact or engagement) between the collet 500 and the expansion sleeve 400, as is discussed in greater detail herein. The first end 401 is positioned to interface with second draw pin face 307. Thus, axial pulling movement of the draw pin 300 is transmitted via the second draw pin face 307 to the first end 401, resulting in axial pulling movement of the expansion sleeve 400. The second end 408 is positioned to interface with the draw bar end face 203. Thus, axial pushing movement of the draw bar 200 is transmitted via the draw bar face 203 to the second end 408, resulting in axial pushing movement of the expansion sleeve 400.

The expansion sleeve 400 is a flexible member that includes an interior surface including interior surfaces 402 and 409 and an exterior surface including a clamping portion 403, flange extraction face 404, second taper 405, circumferential tab 406, flange stop face 407, and sleeve lead-in taper 410. The interior surfaces 402 and 409 are configured to interface with the draw pin 300 and maintain concentricity therewith. The first guiding diameter 303 prevents the interior surface 409 from collapsing at the second end 408. The circumferential shoulder 306 prevents the interior surface 402 from collapsing at the first end 401. When the draw pin 300 is pushed further into clamping assembly 100, the circumferential shoulder 306 is moved beyond the first end 401, which is instead aligned with the draw pin groove 304. The reduced diameter of the draw pin groove 304 allows the expansion sleeve to collapse at the first end 401, enabling easier application or removal of a collet 500 from the first end 401. When the draw pin is subsequently pulled, the draw pin taper 305 guides the expansion of the first end 401 back to the circumferential shoulder 306.

The circumferential tab 406 is positioned within the circumferential groove 603 in the collet adapter 600. The interaction between the circumferential tab 406 and the circumferential groove 603 maintains the expansion sleeve 400 within the same general axial position within the first bore 600B, and further prevents the expansion sleeve 400 from radial over-expansion. The first guiding diameter 303 acts to maintain the circumferential tab 406 within the circumferential groove 603. The circumferential tab 406 has a length 406L and a height 406H, and includes the flange stop face 407, the second taper 405, and the flange extraction face 404. The flange stop face 407 is positioned to interface with the groove stop face 602. Thus, the flange stop face 407 limits axial pulling movement of the expansion sleeve 400 and also prevents damage to collet 500 via this limited movement. The second taper 405 is positioned to interface with the first taper 604. Thus, the second taper 405 limits axial pushing movement of the expansion sleeve 400. Thus, the expansion sleeve 400 cooperates with the draw pin 300 to define a containment system configured maintain the expansion sleeve 400 within an axial envelope and a radial envelope within the collet adapter 600. The axial envelope is defined by the length 406L of the circumferential tab 406 and axial length 603L of the circumferential groove 603. The radial envelope is defined by the height 406H of the circumferential tab 406 the radial expansion thereof being limited by the depth 603D of the circumferential groove 603. Axial movement of the draw pin 300 in the expansion sleeve within the axial envelope causes a portion of the expansion sleeve 400 (e.g., axial legs 413A, 413B, 413C and 413D) to expand radially outward to a predetermined maximum diameter to releasably clamp the collet 500 in the collet adapter 600.

However, when the draw pin 300 is taken out, the expansion sleeve 400 can collapse radially and the second taper 405 helps guide the now reduced diameter circumferential tab 406 around the first taper 604 for easier removal from the collet adapter 600. The flange extraction face 404 acts to detach the collet 500 during unclamping via axial pushing movement as is discussed in greater detail herein.

The expansion sleeve 400 includes a clamping portion 403. The clamping portion 403 is positioned to translate the axial movements into a clamping force by deflecting the collet 500 into the collet adapter 600, as is discussed in greater detail herein. The expansion sleeve 400 is disposed partially inside the collet 500 to impart forces from a position inside the collet 500. The expansion sleeve 400 includes one or more back slots 411 and one or more front slots 412 so that the diameter of the expansion sleeve is flexible. The slots 411 and 412 define axial legs 413 (413A, 413B, 413C, and 413D in FIG. 8) and 414 (414A, 414B, 414C, and 414D in FIG. 8). The expansion sleeve 400 includes a plurality of front axial legs 413 (413A, 413B, 413C, and 413D in FIG. 8). In one embodiment, the expansion sleeve 400 includes two front axial legs 413. In one embodiment, the expansion sleeve 400 includes five axial front legs 413. In one embodiment, the expansion sleeve 400 includes at least three front axial legs 413. The expansion sleeve 400 also includes a plurality of back axial legs 414 (414A, 414B, 414C, and 414D in FIG. 8). In one embodiment, the expansion sleeve 400 includes two back axial legs 414. In one embodiment, the expansion sleeve 400 includes five axial back legs 414. In one embodiment, the expansion sleeve 400 includes at least three back axial legs 414.

Figure 9:
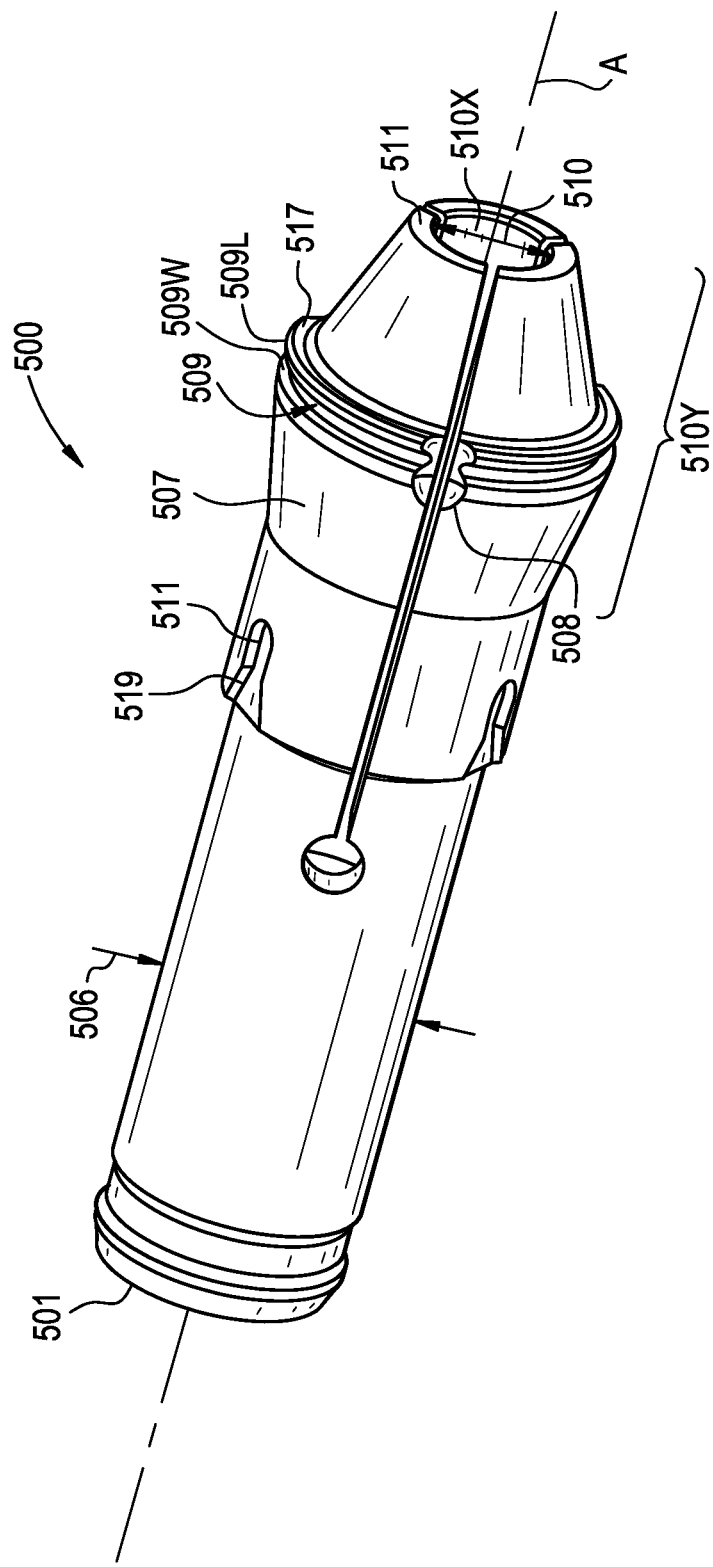
FIG. 9 is a perspective view of the collet.
Figure 10:
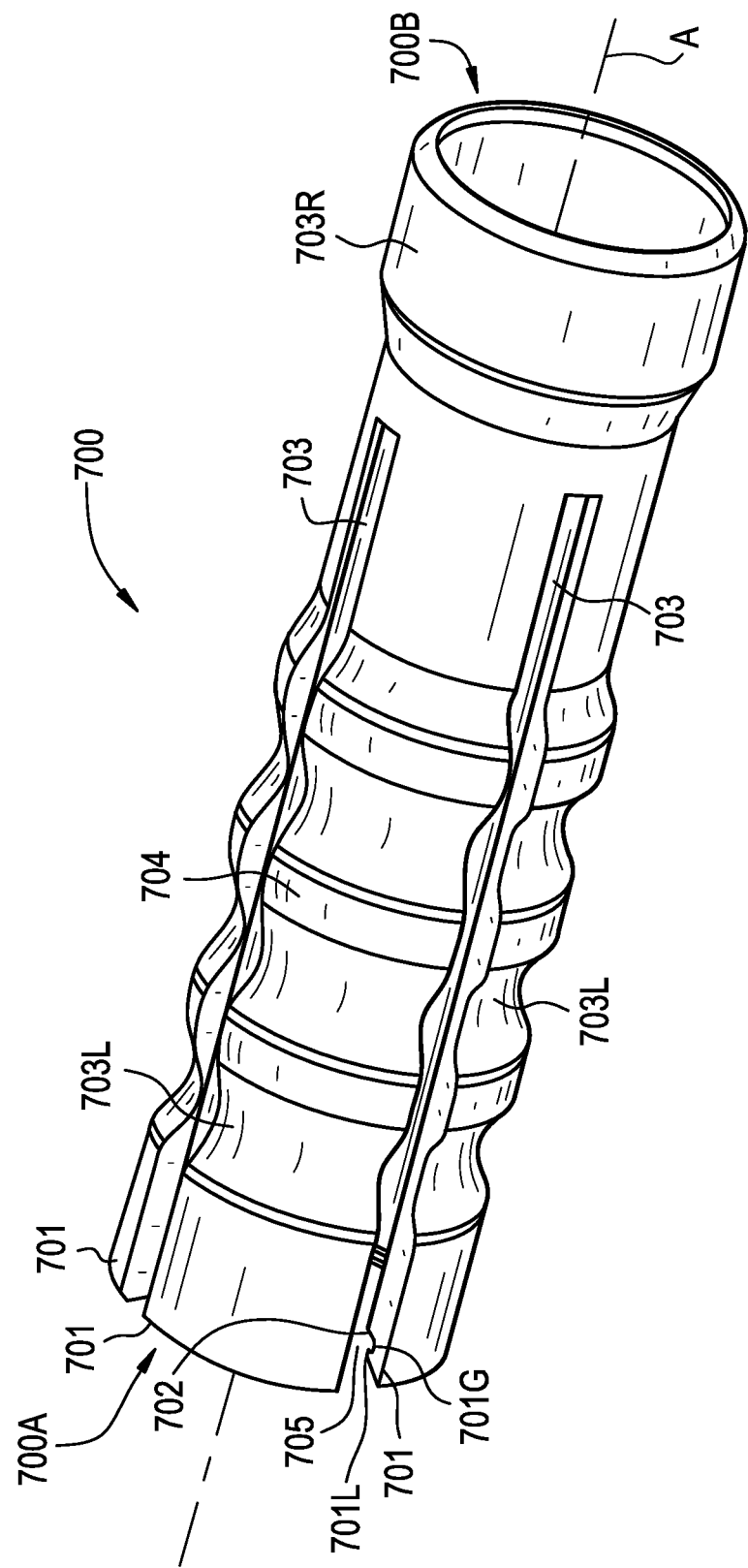
FIG. 10 is a perspective view of the collet extraction tool.

Referring to FIGS. 4A-4B, 5, and 9, the collet 500 is sized and configured to hold and position a workpiece in the clamping assembly 100 via collet clamping diameter 510 defined by an inner surface 510X of a tool holding portion 510Y that extends from a front end 551 of the collet towards the first end face 501 of the collet 500, as shown in FIG. 10. Collet 500 includes collet slots 518 so that the collet is flexible enough to collapse radially when applying the clamping force to the workpiece.

The collet 500 includes a first end face 501 positioned to interface with the flange extraction face 404. As discussed above, the flange extraction face 404 acts to detach the collet 500 by abutting the first end face 501. This force and movement result in detachment of the first collet clamping taper 507 from the adapter clamping taper 609, enabling easier removal of the collet 500. The collet 500 includes an exterior surface including first collet lead-in taper 502, a first collet lead-in diameter 503, a collet lead-in groove 504, and a second collet lead-in diameter 505, which are sized and configured to make it easier to load the collet 500 into the collet adapter 600 and over the expansion sleeve 400. The second collet lead-in diameter 505 also provides alignment of the collet rotation axis with the rotation axis of the collet adapter if there is an angular deviation in between both, and helps keep the collet 500 concentric with the collet adapter 600 during installation of the collet.

The exterior surface of collet 500 also includes a collet guiding diameter 506 and a first collet clamping taper 507. The first collet clamping taper 507 is located on the tool holding portion 510Y of the collet and further acts to center the collet 500 within the collet adapter 600. Deflection of the collet guiding diameter 506 is the result of axial movement the clamping portion 403 along the interior surface of the collet 500. The interior surface of the collet 500 includes first collet internal diameter 512, a second collet clamping taper 513, a second collet internal diameter 514, a second collet lead-in taper 515, and a third collet lead-in diameter 516. The first collet internal diameter 512, second collet internal diameter 514, and third collet lead-in diameter 516 help maintain concentricity between the collet 500. The second collet lead-in taper 515 eases installation of the collet 500 over the expansion sleeve 400 via interaction with sleeve lead-in taper 410. As shown in FIG. 9, the collet 500 includes a collet extraction groove 509 that extends circumferentially around the exterior surface of the collet 500 at the terminus of the first collet clamping taper 507. The collet extraction groove 509 is bounded by a radial collet wall 509W on a side adjacent to the first collet clamping taper 507 and by a radially extending lip 509L that is opposite the collet wall 509W. The lip 509L has an axial collet stop face 517 that faces towards the front end 551 of the collet.

As the clamping portion 403 is brought into contact with the second collet clamping taper 513, a radial force is exerted on the collet 500 which radially deflects the exterior surface of the collet 500. This radial force pushes the exterior surface of the collet 500, such as the collet guiding diameter 506, into the interior surface of the collet adapter 600, and clamps the collet 500 in place.

The collet 500 includes an orientation keyway 511 configured to align with the orientation pin 608 from the collet adapter 600. In one embodiment, the orientation keyway 511 includes a lead-in angle 519 (see FIG. 9) making it easier to align the orientation keyway 511 with the orientation pin 608.

Referring now to FIGS. 3, 4B, and 10, some embodiments of the present disclosure are directed to a collet extraction tool 700 allowing extraction of the collet 500 from the collet adaptor 600. The collet extraction tool 700 extends from a collet engagement end 700A to a gripping end 700B and is coaxial with the axis A. The collet extraction tool 700 is shown having three latches 701 for gripping the collet 500. Each of the latches 701 includes a circumferential groove 701G extending at least partially around an inner surface of the collet extraction tool 700. The circumferential groove 701G is bounded at the engagement end 700A of the collet extraction tool 700 by a circumferentially extending lip 701L on each of the latches 701. The circumferential groove 701G is positioned and sized to interact with the collet extraction groove 509 and receive the lip 509L on the collet extraction groove 509. The circumferential groove 701G is bounded on a side opposite the lip 701L by an axial land 702 which is included to engage a portion of collet 500. In one embodiment, the axial land 702 interfaces with the collet stop face 517 on the collet 500, thus limiting axial movement of the collet extraction tool 700 when applied to the collet 500. Axially applied forces can then insert or remove the collet 500 from the first bore 600B. In one embodiment, the collet 500 includes an orientation keyway 508 to orient the collet extraction tool 700 on the collet 500 in similar fashion to orientation keyway 511 for orienting the collet 500 and the collet adapter 600.

The body of the collet extraction tool 700 is a castellated tube having a bore 705 and including three legs 703L extending from a ring 703R. Each of the legs 703L are separated by a slot 703, which makes the collet extraction tool 700 flexible enough to expand and contract radially, such as when engaging and disengaging from the collet 500. In one embodiment, the collet extraction tool 700 includes one or more handles 704 making it easier to hold and manipulate the collet extraction tool 700.

Figure 11A:
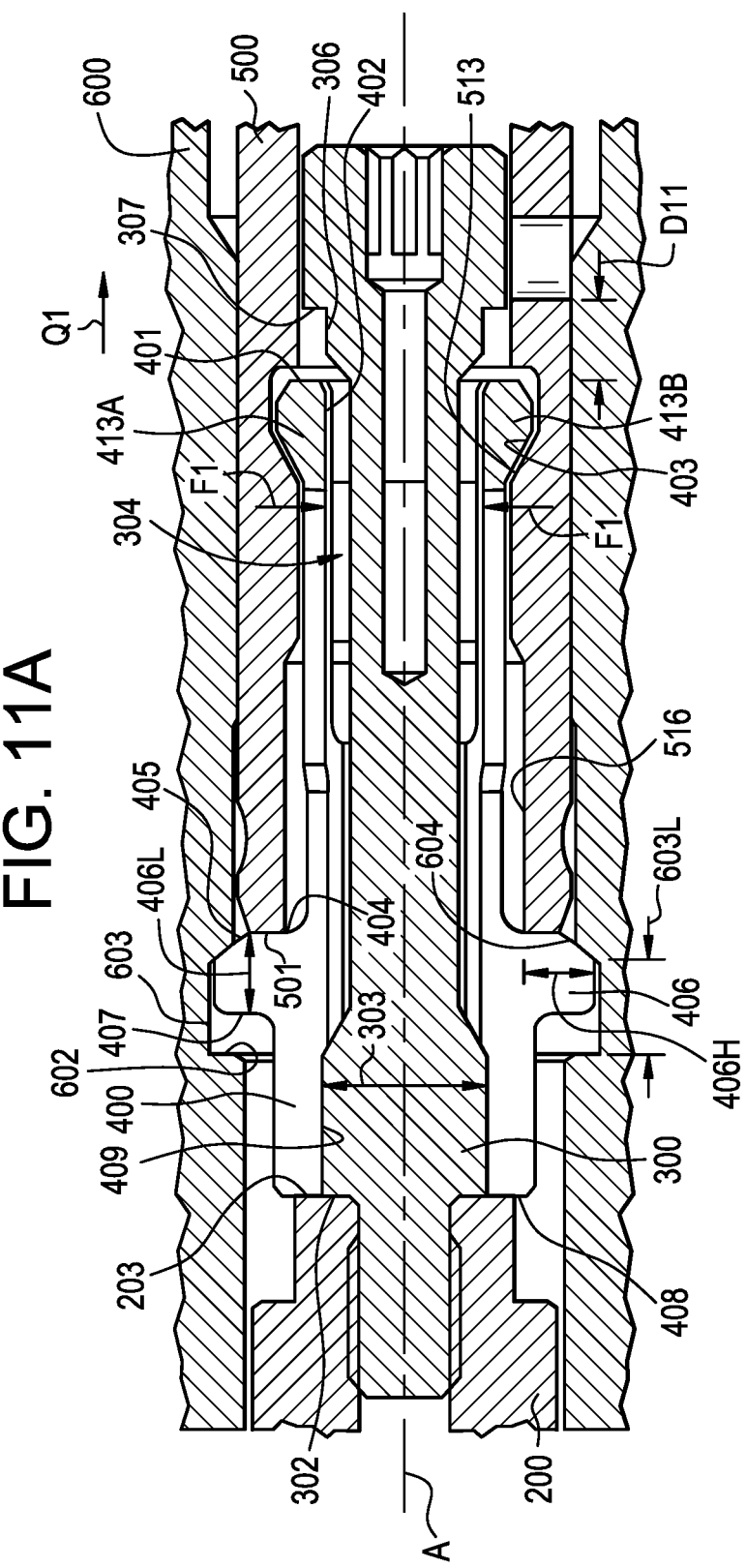
FIG. 11A is an enlarged view of FIG. 5 illustrating the unclamped position.

As shown in FIG. 11A, the clamping assembly 100 is in an unclamped position. In the unclamped position the draw bar 200 displaces the draw pin 300 in the direction of the arrow Q1. In the unclamped position the axial legs 413A, 413B, 413C and 413D of the expansion sleeve 400 are in a relaxed state and can be collapsed radially inward by the collet 500 in the direction of the arrows F1 into the draw pin groove 304. In the unclamped position the draw bar end face 203 abuts the second axial end 408 of the expansion sleeve 400 and there is an axial gap D11 between first end 401 of the expansion sleeve 400 and the draw pin stop axial face 307. In the unclamped position the clamping portion 403 of the expansion sleeve 400 is not engaged with the clamping taper 513 of the collet 500 and the collet 500 can be removed from the collet adapter 600. In the unclamped position the circumferential shoulder 306 of the draw pin 300 is not engaged with the guiding diameter 402 of the expansion sleeve 400.

Figure 11B:
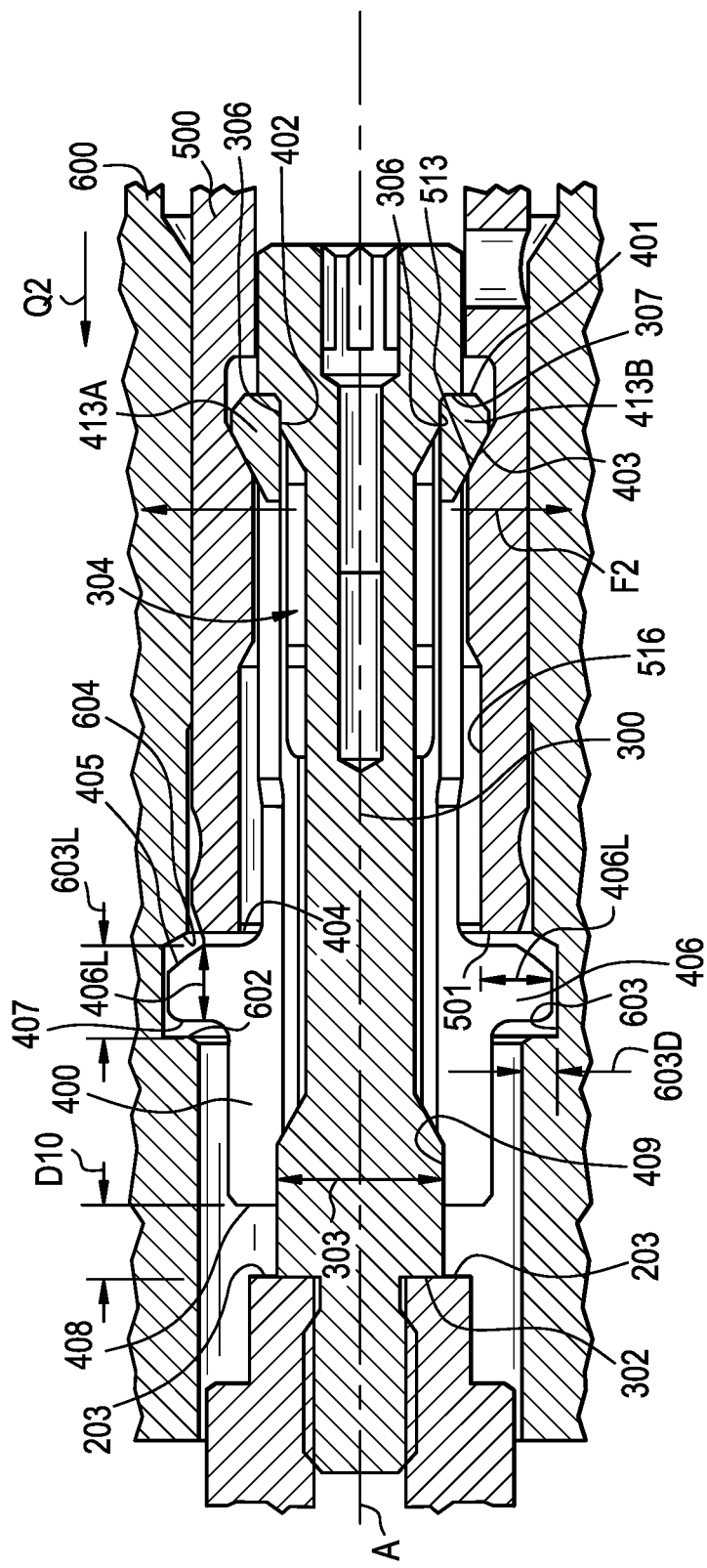
FIG. 11B is an enlarged view of FIG. 4A illustrating the clamped position.

As shown in FIG. 11B, the clamping assembly 100 is in a clamped position. In the clamped position the draw bar 200 displaces the draw pin 300 in the direction of the arrow Q2. In the clamped position the axial legs 413A, 413B, 413C and 413D of the expansion sleeve 400 are in an expanded state and are extended radially outward in the direction of the arrows F2 away from the groove 304. In the clamped position the draw bar end face 203 is spaced apart from the second axial end 408 of the expansion sleeve 400 by an axial gap D10 and the first end 401 of the expansion sleeve 400 and the draw pin stop axial face 307 are abutted against each other. In the clamped position the clamping portion 403 of the expansion sleeve 400 is engaged with the clamping taper 513 of the collet 500 and the collet 500 is itself expanded. Expansion of the collet 500 by the clamping force eliminates the small gap between the collet guiding diameter 506 and adapter guiding diameter 606, securing the collet 500 in the collet adapter 600. This reduces dispersion of run-out and also centers more precisely the collet 500 in the clamped position. In the clamped position the circumferential shoulder 306 of the draw pin 300 is seated on the guiding diameter 402 of the expansion sleeve 400 to retain the axial legs 413A, 413B, 413C and 413D in the expanded state.

Removing the collet 500 from clamping assembly 100 includes pushing draw bar 200 forward through the collet adapter 600 and towards the collet loading end 600C. The draw bar 200 moves the draw pin 300 with it. The draw bar end face 203 is once again brought into abutting contact with second axial end 408, thus displacing the expansion sleeve 400. As the expansion sleeve 400 is displaced, the circumferential tab 406 is displaced in the circumferential groove 603. As the circumferential tab 406 is displaced towards the collet end face 501, it is ultimately abutted against the collet end 501 at flange extraction face 404 and provides a removing force to the collet 500 in the direction of the arrow Q1. The contact between the clamping portion 403 and the second collet clamping taper 513 is also removed by this axial movement, reducing the radial force exerted by the collet 500 on the collet adapter 600. The collet 500 is thus easier to remove from the first bore 600B.

The clamping assembly 100 allows for quick manual and/or automatic change-out or attachment out of collets 500.

While the present disclosure has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention will not be limited to the particular embodiment disclosed as the best mode contemplated for carrying out this invention, but that the invention will include all embodiments falling within the scope of the appended claims.

Table 1 provides a listing and description of element numbers including function and contact configuration. In particular, column 1 identifies the element number that is employed on one or more of FIGS. 1-11B; column 2 provides a description of the element number; column 3 identifies the functionality or purpose for the particular element; column 4 describes the clamping situation during which the element is employed, including extracting the collet 500, the clamped position (e.g., FIG. 11B), the unclamped position (e.g., FIG. 11A), and the empty configuration with the collet 500 removed from the collet adapter 600 (e.g., FIG. 6); column 5 identifies the contact type the element has with a mating component, including, bearing contact, fixed contact, guiding contact and a free arrangement with no contact; and column 6 identifies other element number which the element identified in column 1 contacts or interfaces with.

TABLE 1

| 1<br>Element<br>No. | 2<br>Description | 3<br>Functionality | 4<br>Clamping<br>situation | 5<br>Contact type | 6<br>Other element<br>number |
|---|---|---|---|---|---|
| A | Longitudinal axis | Reference line | | | |
| 100 | Manual and/or automatic quick-change attachment | Provides for quick change out of a collet | — | — | — |

TABLE 1-continued

| 1 Element No. | 2 Description | 3 Functionality | 4 Clamping situation | 5 Contact type | 6 Other element number |
|---|---|---|---|---|---|
| 200 | Draw bar | Transmit clamping force and axial movement from the pulling device (not shown) to the draw pin | — | — | — |
| 201 | Draw bar mounting portion | Joining the draw bar to the pulling device | all | fixed | Pulling device (not shown) |
| 202 | Draw bar coupling portion | Joining the draw bar to the draw pin 300 | all | fixed | 301 |
| 203 | Draw bar end face | Gives the axial position to the draw pin according to the drawbar. Pushes against the expansion sleeve 400 to liberate the collet when unclamping | Extracting Clamped Unclamped Empty cl. | Bearing Bearing Bearing Bearing | 302/408 302 302/408 302 |
| 204 | Draw bar hex | Hex for tightening the draw bar 200 on the pulling device | all | free | — |
| 300 | Draw pin | Transmit clamping force and a part of the axial movement to the expansion sleeve | — | — | — |
| 301 | Draw pin coupling portion | Joining the draw bar 200 to the draw pin 300 | all | fixed | 202 |
| 302 | First draw pin stop face | Gives the axial position to the draw pin 300 according to the draw bar 200 | all | bearing | 203 |
| 303 | First draw pin guiding diameter | Guidance and centering of the expansion sleeve 400 on the draw pin. This diameter prevents the expansion sleeve 400 from collapsing at the first end and prevents it from leaving the groove in the collet adapter. When the draw pin 300 is taken out of the dmw bar 200, the expansion sleeve can collapse radially inward at the second end and glide forwards. In this way, the expansion sleeve 400 can be taken out of the collet adapter 600. | all | guiding | 409 |
| 304 | Draw pin groove | Allows the expansion sleeve to collapse at the first end while extracting or loading a collet 500. | all | free | — |
| 305 | Draw pin taper | Opens up the expansion sleeve 400 at the first end while making the clamping or empty clamping movement. | all | free | — |
| 306 | Second draw pin guiding diameter | Guiding and centering the draw pin 300 while clamping the collet 500. Prevent the expansion sleeve 400 from collapsing at the first end in clamped and empty clamped position | Extracting Clamped Unclamped Empty | free guiding free guiding | — 402 — 402 |
| 307 | Second draw pin stop face | Transmit clamping force and a part of the axial movement to the expansion sleeve 400. | Extracting Clamped Unclamped Empty | free bearing free bearing | — 401 — 401 |
| 308 | Third draw pin guiding diameter | Pre-centering (with gap) the draw pin 300 in the collet 500 in unclamped position | all | free | — |
| 309 | Draw pin hexagonal bore | Hexagonal bore for tightening the draw pin 300 on the draw bar 200 | all | free | — |
| 310 | Draw pin thread | Allows optionally to fix an end stop for the work piece if needed. | all | free | — |
| 311 | Draw pin end face | Allows optionally to eject the work piece if needed. | all | free | — |
| 400 | Expansion sleeve | Transmit clamping force and a part of the axial movements to the collet 500. This flexible element collapses on the first end when entering or extracting the collet. When putting in the expansion sleeve 400 in the adapter 600, the expansion sleeve 400 collapses radially inward before gliding in the groove. Because the clamping force is transmitted over a taper, the clamping force will expand the collet 500 to eliminate the small gap between the guiding diameter of the collet 500 and the collet adapter 600. This reduces dispersion of run-out and centers more precisely the collet 500 in clamped position. | — | — | — |
| 401 | First sleeve end face | Transmit clamping force and a part of the axial movement from the draw pin 200. | Extracting Clamped Unclamped Empty | free bearing free bearing | — 307 — 307 |
| 402 | First sleeve guiding diameter | Guiding and centering the draw pin 200 while clamping the collet 500. On the sulface defined by the first sleeve guiding diameter 402, the draw pin 300 prevents the expansion sleeve 500 from collapsing at the first end in clamped and empty clamped position. | Extracting Clamped Unclamped Empty | free guiding free guiding | — 306 — 306 |

TABLE 1-continued

| Element No. | Description | Functionality | Clamping situation | Contact type | Other element number |
|---|---|---|---|---|---|
| 403 | Sleeve clamping taper | Transmit clamping force and a part of the axial movements to the collet 500. Because the clamping force is transmitted over a taper, the clamping force will expand the collet 500 to eliminate the small gap between the guiding diameter of the collet 500 and the collet adapter 600. This reduces dispersion of run-out and centers more precisely the collet 500 in clamped position. | Extracting Clamped Unclamped Empty | free bearing free free | — 513 — — |
| 404 | Flange extraction face | Transmit unclamping force and movement to the collet 500. The Flange extraction face 404 detaches the first collet clamping taper from the adapter clamping taper when unclamping the collet. | Extracting Clamped Unclamped Empty | free free bearing free | — — 501 — |
| 405 | Flange stop taper | Stops the axial movement of the expansion sleeve 400 when unclamping and extracting the collet. When the draw pin 300 is taken out of the draw bar 200, the expansion sleeve 400 can glide forward and collapse radially inward at the second end by following the groove stop taper. In this way, the expansion sleeve 400 can be taken out of the collet adapter 600. | Extracting Clamped Unclamped Empty | bearing free bearing free | 604 — 604 — |
| 406 | Flange guiding diameter or tab | Pre-centering (with gap) the expansion sleeve 400 in the collet adapter 600. Prevents the expansion sleeve 400 from expanding in over its nominal radial dimension. | all | guiding | 603 |
| 406H | Height of tab 406 | Prevents the expansion sleeve 400 from expanding over its nominal radial dimension. | | | |
| 406L | Length of tab 406 | Limits and establishes axial movement of the expansion sleeve 400 in the collet adapter 600. | | | |
| 407 | Flange stop face | Stops axial movement in empty clamping position and protects the collet 500 from damage. | Extracting Clamped Unclamped Empty | free free free bearing | — — — 602 |
| 408 | Second sleeve end face | Transmit the unclamping force and a part of the axial movement from the draw bar 200. The second sleeve end face 408 is used to detach the first collet clamping taper from the adapter clamping taper when unclamping the collet. | Extracting Clamped Unclamped Empty | Bearing free Bearing free | 203 — 203 — |
| 409 | Second sleeve guiding diameter | Guidance and centering of the expansion sleeve 400 on the draw pin 300. This diameter prevents the expansion sleeve 400 from collapsing at the first end and prevents it from leaving the groove in the collet adapter. When the draw pin 300 is taken out of the dmw bar 200, the expansion sleeve 400 can collapse radially inward at the second end and glide forward. In this way, the expansion sleeve 400 can be taken out of the collet adapter. | all | guiding | 303 |
| 410 | Sleeve lead-in taper | Makes it easier to load the collet, prevents frontal collision between the collet and the expansion sleeve 400 while loading the collet Closes the expansion sleeve 400 on the first end in contact with the second collet lead-in taper (515) when loading the collet | all | free | — |
| 411 | Sleeve back slots | Makes the expansion sleeve 400 flexible enough to collapse radially at the second end when put in or take out the expansion sleeve 400 (assembly without draw pin) | all | free | — |
| 412 | Sleeve front slots | Makes the expansion sleeve 400 flexible enough to collapse radially at the first end, when loading or extracting the collet | all | free | — |
| 413A 413B 413C 413D | Legs front sleeve | Extend outwardly to clamp collet 500. | | | |
| 414A 414B 414C 414D | Legs back sleeve | Extend outwardly to allow draw pin 300 to enter and the contracted assembly to releasably contain the expansion sleeve 400. | | | |
| 500 | collet | Transform the axial clamping force and movement from the pulling device in a radial clamping force and movement, clamping a workpiece. Center the work piece according to the rotation axis of the machine spindle. | — | — | — |

TABLE 1-continued

| 1 Element No. | 2 Description | 3 Functionality | 4 Clamping situation | 5 Contact type | 6 Other element number |
|---|---|---|---|---|---|
| 501 | Collet end face | Transmit unclamping force and movement from the expansion sleeve 400 to the collet. This force and this movement detach the first collet clamping taper from the adapter clamping taper when unclamping the collet. | Extracting Clamped Unclamped Empty | free free bearing free | — — 404 — |
| 502 | First collet lead-in taper | Makes it easier to load the collet 500, prevents frontal collision between the collet 500 and the collet adapter 600 while loading the collet 500 in the collet adapter 600. | all | free | — |
| 503 | First collet lead-in diameter | Makes it easier to load the collet 500. Pre-centering (with gap) the collet 500 first in the adapter lead-in diameter and second in the adapter guiding diameter while loading the collet 500 in the collet adapter 600. | all | free | — |
| 504 | Collet lead-in groove | Makes it easier to load the collet 500 in the collet adapter 600. Prevents the collet 500 from sticking in the collet adapter lead-in diameter if there is an angular deviation between the rotation axis of the collet adapter 600 and the collet 500. | all | free | — |
| 505 | Second collet lead-in diameter | Makes it easier to load the collet 500 in the collet adapter 600. Alignment of the collet rotation axis with the rotation axis of the collet adapter 600 if there is an angular deviation in between both. Pre-centering (with gap) the collet first in the adapter lead-in diameter and second in the adapter guiding diameter while loading the collet. | all | free | — |
| 506 | Collet guiding diameter | Centers the collet 500 precisely in the collet adapter guiding diameter in clamped and unclamped position. There is still a very small gap in between these two diameters, characteristic for all draw-in collets with cylindrical shank. If the collet is drawn back at its back end, this gap gets bigger because the collet guiding diameter constricts as a result of the axial pulling force. In this invention, the gap is eliminated through the clamping force in clamped position, because the axial clamping force is decomposed over the second collet clamping taper (513) in an axial and a radial force component. The radial force component expands the collet guiding diameter radially while clamping the collet. This increases centering precision and makes run out dispersion smaller. | Extracting Clamped Unclamped Empty | free guiding guiding free | — 606 606 — |
| 507 | First collet clamping taper | Centers the collet 500 according to the collet adapter 600. | Extracting Clamped Unclamped Empty | free bearing free free | — 609 — — |
| 508 | First collet orientation keyway | Allows optionally to orientate the collet 500 in the extractor 700. | Extracting Clamped Unclamped Empty | Free free free free | — — — — |
| 509 | Collet extraction groove | Transmits the extracting movement from the extractor 700 to the collet 500. | Extracting Clamped Unclamped Empty | bearing free free free | 701 — — — |
| 509L | Circumferential lip of the groove | Seats in the groove 701G of the extraction tool 700. | | | |
| 510 | Collet clamping diameter | Centers and holds the workpiece | Extracting Clamped Unclamped Empty | free bearing free free | — Workpiece — — |
| 511 | Second collet orientation keyway | Orientation of the collet 500 in the collet adapter 600, prevents the collet from rotating between different clamping/unclamping cycles. | Extracting Clamped Unclamped Empty | free guiding guiding free | — 608 608 — |
| 512 | First collet internal diameter | Pre-centering (with gap) the draw pin 300 in the collet 500 in unclamped position. | all | free | — |
| 513 | Second collet clamping taper | Transmit clamping force and a part of the axial movements from the expansion sleeve 400. Because the clamping force is transmitted over a taper, the clamping force will expand the collet what eliminates the small gap between the | Extracting Clamped Unclamped Empty | free bearing free free | — 403 — — |

TABLE 1-continued

| 1 Element No. | 2 Description | 3 Functionality | 4 Clamping situation | 5 Contact type | 6 Other element number |
|---|---|---|---|---|---|
| | | guiding diameter of the collet and the collet adapter. This reduces dispersion of run-out and centers more precisely the collet in clamped position. | | | |
| 514 | Second collet internal diameter | Pre-centering (with gap) the draw pin in the collet when loading the collet | all | free | — |
| 515 | Second collet lead-in taper | Closes the expansion sleeve 400 on the first end in contact with the sleeve lead-in taper (410) when loading the collet | all | free | — |
| 516 | Third collet lead-in diameter | Pre-centering (with gap) the expansion sleeve 400 in the collet when loading the collet | all | free | — |
| 517 | Collet stop face | Makes it easier to push the extractor 700 on the collet 500. Stops the axial movement when pushing the extractor 700 on the collet. | all | free | — |
| 518 | Collet slot | Makes the collet 500 flexible enough to collapse radially when applying the clamping force. | all | free | — |
| 519 | Key way lead-in angle | Makes it easier to load the collet 500. This angle turns the collet when there is a misalignment between the second collet orientation keyway (511) and the orientation pin (608). | all | free | — |
| 600 | Collet adapter | Main body, joining the collet 500 to the machine spindle. This part also keeps the expansion sleeve 400 at its predetermined position. | all | free | — |
| 600A | draw bar receiving end of collet adapter | Portion of collet adapter to receive draw bar 200. | | | |
| 600B | Through bore of collet adapter | Cylindrical bore extending through collet adapter 600. | | | |
| 600C | collet loading end of collet adapter | Portion of collet adapter 600 for receiving and loading the collet 500. | | | |
| 601 | First adapter guiding diameter | Pre-centering (with great gap) the draw bar 200 in the collet adapter 600. | all | free | — |
| 602 | Groove stop face | Stops axial movement in empty clamping position and prevents the collet 500 from being damaged. | Extracting Clamped Unclamped Empty | free free free bearing | — — — 407 |
| 603 | Groove diameter | Pre-centering (with gap) the expansion sleeve 400 in the collet adapter. Prevents the expansion sleeve 400 to expand over its nominal radial dimension, | all | guiding | 406 |
| 603D | Depth of groove 603 | Prevents the expansion sleeve 400 to expand over its nominal radial dimension. | | | |
| 603L | Axial length of groove 603 | Limits and establishes axial movement of the expansion sleeve in the collet adapter 600. | | | |
| 604 | Groove stop taper | Stops the axial movement of the expansion sleeve when unclamping and extracting the collet. When the draw pin is taken out of the draw bar, the expansion sleeve 400 can glide forwards and collapse radially at the second end by following the groove stop taper. In this way, the expansion sleeve 400 can be taken out of the collet adapter. | Extracting Clamped Unclamped Empty | bearing free bearing free | 405 — 405 — |
| 605 | Adapter mounting portion | Joining the collet adapter 600 to the machine spindle. | all | fixed | Machine spindle |
| 606 | Adapter guiding diameter | Centers the collet 600 precisely on the collet guiding diameter in clamped and unclamped position. There is still a very small gap in between this two diameters characteristic for all draw-in collets with cylindrical shank. If the collet is drawn back at its back end, this gap gets bigger because the collet guiding diameter constricts as a result of the axial pulling force. In this invention, the gap is eliminated through the clamping force in clamped position, because the axial clamping force is decomposed over the second collet clamping taper (513) in an axial and a radial force component. The radial force component expands the collet guiding diameter radially while clamping the collet 500. This increases centering precision and makes run out dispersion smaller. | Extracting Clamped Unclamped Empty | free guiding guiding free | — 506 506 — |
| 607 | Adapter lead-in taper | Makes it easier to load the collet 500, prevents frontal collision between the collet 500 and the collet adapter 600 while loading the collet 500. | all | free | — |

TABLE 1-continued

| Element No. | Description | Functionality | Clamping situation | Contact type | Other element number |
|---|---|---|---|---|---|
| 608 | Orientation pin | Orientation of the collet 500 in the collet adapter 600, prevents the collet 500 from rotating between different clamping/unclamping cycles. | Extracting<br>Clamped<br>Unclamped<br>Empty | free<br>guiding<br>guiding<br>free | —<br>511<br>511<br>— |
| 609 | Adapter clamping taper | Centers the collet 500 according to the collet adapter 600. Transforms the axial clamping force from the pulling device in a radial clamping force to hold the work piece. | Extracting<br>Clamped<br>Unclamped<br>Empty | free<br>bearing<br>free<br>free | —<br>507<br>—<br>— |
| 610 | Adapter lead-in diameter | Makes it easier to load the collet 500. Pre-centering (with gap) the collet 500 first on the first collet lead-in diameter, then on the second collet lead-in diameter and finally, with a smaller gap, on the collet guiding diameter. | all | free | — |
| 700 | Collet extractor or collet extraction tool. | This part allows to extract the collet form the collet adapter. | — | — | — |
| 701 | Extractor nose | Transmits the extracting movement from the extractor to the collet 500. | Extracting<br>Clamped<br>Unclamped<br>Empty | bearing<br>free<br>free<br>free | 509<br>—<br>—<br>— |
| 701G | Circumferential groove | Formed in an inner surface of the extraction tool tube for receiving the lip 509L of the collet 500. | | | |
| 702 | Extractor end stop | Makes it easier to push the extractor on the collet. Stops the axial movement when pushing the extractor on the collet 500. | all | free | — |
| 703 | Extractor slot | Makes the extractor flexible enough to expand radially when pushing the extractor on the collet 500. | all | free | — |
| 703L | Extraction tool legs | Flexible legs separated by the slots 703 for releasably grasping the collet 500. | | | |
| 703R | Ring portion of extraction tool | Continuous ring holds the legs 703L together as one unitary piece. | | | |
| 704 | handle | Place to hold manually the extractor 700. | all | free | — |
| 705 | Extractor through bore | Makes the extractor flexible enough to expand radially when pushing the extractor 700 on the collet 500.<br>Allows to push the extractor 700 over the collet nose. | all | free | — |

What is claimed is:

1. A clamping assembly for releasably clamping a collet, the clamping assembly comprising:
a collet adapter having a mounting portion configured to secure the collet adapter to a spindle of a machine;
an expansion sleeve movably disposed in collet adapter, the expansion sleeve extending coaxially with a longitudinal axis thereof and between a first axially facing sleeve end and a second axially facing sleeve end;
a draw pin extending coaxially with the longitudinal axis and between a first draw pin end and a second draw pin end, the draw pin having an axially facing pin-stop surface facing away from the second draw pin end, the draw pin extending partially in and in axially moveable relation to the expansion sleeve with the first draw pin end extending outwardly from the first axially facing sleeve end of the expansion sleeve and the second draw pin end and the pin-stop surface extending outwardly from the second axially facing sleeve end of the expansion sleeve;
the first axially facing sleeve end facing towards the pin-stop surface and the second axially facing sleeve end facing away from the pin-stop surface, the expansion sleeve being axially displaceable between a clamped position and an unclamped position in response to axial movement of the draw pin in the expansion sleeve, wherein in the clamped position the pin-stop surface axially engages the first axially facing sleeve end of the expansion sleeve; and in the unclamped position, the second axially facing sleeve end engaging the first draw pin end.

2. The clamping assembly of claim 1, wherein:
the collet comprises an extraction groove extending circumferentially around the collet proximate a front end of the collet;
the clamping assembly further comprises an extraction tool that extends from a collet engagement end to a gripping end thereof; and
wherein the extraction tool comprises at least one latch proximate the collet engagement end, the at least one latch being releasably connected to the collet for removing the collet from the clamping assembly.

3. The clamping assembly of claim 2, wherein the extraction tool is configured as a castellated tube having at least two legs extending from a ring portion of the tube, adjacent pairs of the legs being spaced apart by a respective slot and wherein the at least one latch comprises a circumferential groove extending around an inner surface of the tube, the circumferential groove being configured to receive a lip extending around an exterior surface of the collet.

4. The clamping assembly of claim 3, wherein the groove comprises at least one axial land configured to engage a portion of the collet.

5. The clamping assembly of claim 1, wherein in the unclamped position, a portion of the expansion sleeve engages an axial end of the collet thereby imparting a removing force to the collet.

6. A clamping assembly for releasably clamping a collet, the clamping assembly comprising:
- a collet adapter comprising a first interior surface defining a first bore concentric about a longitudinal axis, the first bore extending from a collet loading end to a draw bar receiving end of the collet adapter, the collet adapter having a mounting portion configured to secure the collet adapter to a spindle of a machine;
- an expansion sleeve removably disposed in the first bore and in sliding engagement with a portion of the first interior surface, the expansion sleeve having a second interior surface defining a second bore extending between a first axially facing sleeve end and a second axially facing sleeve end thereof, the second interior surface having a cylindrical guiding diameter portion proximate the second axially facing sleeve end, the expansion sleeve having a first exterior surface extending therearound and the expansion sleeve having a portion of the first exterior surface defining a clamping portion proximate the first axially facing sleeve end thereof, the expansion sleeve extending coaxially with a longitudinal axis thereof and between the first axially facing sleeve end and the second axially facing sleeve end; and
- a draw pin extending coaxially with the longitudinal axis and between a first draw pin end and a second draw pin end, the draw pin having an axially facing pin-stop surface facing away from the second draw pin end, the draw pin extending partially in the second bore and in axially moveable relation to the expansion sleeve with the first draw pin end extending outwardly from the first axially facing sleeve end of the expansion sleeve and the second draw pin end and the pin-stop surface extending outwardly from the second axially facing sleeve end of the expansion sleeve, the draw pin having a second exterior surface, a first portion of the second exterior surface proximate the second draw pin end being a cylindrical shoulder and a second portion of the second exterior surface proximate the first draw pin end being a cylindrical guiding surface, the cylindrical guiding surface centering the expansion sleeve thereon along the cylindrical guiding diameter of the second interior surface of the expansion sleeve and maintaining concentricity between the draw pin and the expansion sleeve;
- the expansion sleeve being axially displaceable between a clamped position and an unclamped position in response to axial movement of the draw pin in the expansion sleeve, wherein in the clamped position the pin-stop surface axially engages the second sleeve end of the expansion sleeve;
- wherein in a clamped position, the cylindrical shoulder of the draw pin engages a cylindrical portion of the second interior surface of the expansion sleeve, thereby preventing the expansion sleeve from collapsing radially inwardly and to retain the clamping portion radially outward to secure the collet in the collet adapter.

7. The clamping assembly of claim 6, wherein the expansion sleeve comprises at least two slots extending along an axial length thereof and extending axially inward from at least one of the first axially facing sleeve end and the second axially facing sleeve end and radially through the expansion sleeve from the first exterior surface to the second interior surface.

8. The clamping assembly of claim 6, wherein the clamping portion comprises a tapered surface.

9. The clamping assembly of claim 6, wherein the collet adapter comprises a first containment feature and the expansion sleeve comprises a second containment feature, and wherein the first containment feature engages the second containment feature to releasably contain the expansion sleeve in the first bore and to limit axial movement of the expansion sleeve in the first bore within a predetermined distance.

10. The clamping assembly of claim 9, wherein the first containment feature comprises a circumferential groove extending radially outward from the interior surface to a depth and the second containment feature comprises a circumferential tab that extends radially outward from the expansion sleeve a height to limit radial expansion of a portion of the expansion sleeve to a predetermine magnitude established to prevent plastic deformation of the expansion sleeve.

11. The clamping assembly of claim 6, wherein the draw pin comprises a taper on the second exterior surface, the taper being configured to urge the clamping portion radially outward to secure the collet in the collet adapter.

12. The clamping assembly of claim 6, wherein
- the clamping portion comprises at least a first axial leg and a second axial leg, the first axial leg and the second axial leg being separated circumferentially by a first axial slot and a second axial slot, each extending axially inward from the first axially facing sleeve end and radially through the expansion sleeve from the exterior surface to the second interior surface, wherein the first axial slot and the second axial slot impart flexibility to the clamping portion so that the first axial leg and the second axial leg flex radially inward; and
- the expansion sleeve further comprising at least a third axial leg and a fourth axial leg, the third axial leg and the fourth axial leg being separated circumferentially by a third axial slot and a fourth axial slot, each extending axially inward from the second axially facing sleeve end and radially through the expansion sleeve from the exterior surface to the second interior surface, wherein the third axial slot and the fourth axial slot impart flexibility to the expansion sleeve so that in an unclamped state the third axial leg and the fourth axial leg flex radially inward; and
- wherein the first axial leg joins integrally with the third axial leg and the fourth axial leg at a position located between the first axially facing sleeve end and a midpoint of the expansion sleeve and the third axial leg joins integrally with the first axial leg and the second axial leg at a position located between the second axially facing sleeve end and the midpoint of the expansion sleeve, thereby forming a tubular configuration of the expansion sleeve.

13. The clamping assembly of claim 12, wherein one of the first axial slot and the second axial slot extend into one of the third axial leg and the fourth axial leg.

14. The clamping assembly of claim 12, wherein one of the third axial slot and the fourth axial slot extend into one of the first axial leg and the second axial leg.

15. The clamping assembly of claim 6, wherein in the unclamped position, a portion of the expansion sleeve engages an axial end of the collet thereby imparting a removing force to the collet.

16. An expansion sleeve for a clamping assembly, the expansion sleeve comprising:
- an interior surface defining a bore extending between a first axially facing sleeve end and a second axially facing sleeve end thereof, the expansion sleeve having an exterior surface extending therearound and a portion of the first exterior surface defining a tapered clamping portion proximate the first end thereof;

the clamping portion comprising at least a first axial leg and a second axial leg, the first axial leg and the second axial leg being separated circumferentially by a first axial slot and a second axial slot, each extending axially inward from the first axially facing sleeve end and radially through the expansion sleeve from the exterior surface to the interior surface, wherein the first axial slot and the second axial slot impart flexibility to the clamping portion so that the first axial leg and the second axial leg flex radially inward;

the expansion sleeve further comprising at least a third axial leg and a fourth axial leg, the third axial leg and the fourth axial leg being separated circumferentially by a third axial slot and a fourth axial slot, each extending axially inward from the second axially facing sleeve end and radially through the expansion sleeve from the exterior surface to the interior surface, wherein the third axial slot and the fourth axial slot impart flexibility to the expansion sleeve so that the third axial leg and the fourth axial leg flex radially inward; and wherein the first axial leg joins integrally with the third axial leg and the fourth axial leg at a position located between the first axially facing sleeve end and a midpoint of the expansion sleeve and the third axial leg joins integrally with the first axial leg and the second axial leg at a position located between the second axially facing sleeve end and the midpoint of the expansion sleeve, thereby forming a tubular configuration of the expansion sleeve.

17. The expansion sleeve of claim 16, wherein one of the first axial slot and the second axial slot extend into one of the third axial leg and the fourth axial leg from the first axially facing sleeve end of the expansion sleeve;

at least one of the first axial slot and the second axial slot terminating between the midpoint of the expansion sleeve and the second axially facing sleeve end of the expansion sleeve;

wherein one of the third axial slot and the fourth axial slot extend into one of the first axial leg and the second axial leg from the second axially facing sleeve end of the expansion sleeve; and at least one of the third axial slot and the fourth axial slot terminating between the first axially facing sleeve end and the midpoint of the expansion sleeve.

18. A clamping assembly for releasably clamping a collet, the clamping assembly comprising:

a collet adapter having a mounting portion configured to secure the collet adapter to a spindle of a machine;

an expansion sleeve movably disposed in collet adapter, the expansion sleeve extending coaxially with a longitudinal axis thereof and between a first axially facing sleeve end and a second axially facing sleeve end;

a draw pin extending coaxially with the longitudinal axis and between a first draw pin end and a second draw pin end, the draw pin having an axially facing pin-stop surface facing away from the second draw pin end, the draw pin extending partially in and in axially moveable relation to the expansion sleeve with the first draw pin end extending outwardly from the first axially facing sleeve end of the expansion sleeve and the second draw pin end and the pin-stop surface extending outwardly from the second axially facing sleeve end of the expansion sleeve;

the first axially facing sleeve end facing towards the pin-stop surface and the second axially facing sleeve end facing away from the pin-stop surface, the entire expansion sleeve being axially displaceable in only one first axial direction when moving from a clamped position to an unclamped position and the entire expansion sleeve being axially displaceable in only one second axial direction opposite to the first direction when moving from an unclamped position to a clamped position in response to axial movement of the draw pin in the expansion sleeve.

* * * * *